US008671459B2

(12) United States Patent
Nooning, III

(10) Patent No.: US 8,671,459 B2
(45) Date of Patent: Mar. 11, 2014

(54) PREVENTION OF SOFTWARE PIRACY USING UNIQUE INTERNAL INTELLIGENCE WITH EVERY SOFTWARE APPLICATION COPY

(75) Inventor: Malcolm Henry Nooning, III, Pittsburgh, PA (US)

(73) Assignee: Malcolm H. Nooning, III, Pittsburgh, PA (US)

( * ) Notice: Subject to any disclaimer, the term of this patent is extended or adjusted under 35 U.S.C. 154(b) by 1652 days.

(21) Appl. No.: 11/678,137

(22) Filed: Feb. 23, 2007

(65) Prior Publication Data
US 2008/0209576 A1  Aug. 28, 2008

(51) Int. Cl.
*H04L 29/00* (2006.01)

(52) U.S. Cl.
USPC ............ 726/29; 713/165; 713/176; 713/179; 713/182; 713/193; 726/30

(58) Field of Classification Search
USPC ................ 713/165, 176, 179, 182, 193, 194; 726/30
See application file for complete search history.

(56) References Cited

U.S. PATENT DOCUMENTS

| 5,666,411 A * | 9/1997 | McCarty | 705/51 |
| 7,024,696 B1 * | 4/2006 | Bahar | 726/26 |
| 2005/0044359 A1 * | 2/2005 | Eriksson et al. | 713/165 |

OTHER PUBLICATIONS historic_deciphering_01_npl.pdf Professor John-Allen Payne, nonfiction reading—iii: stories from the history of computers, http://www.rit.edu/~japnce/payne/computers/index.html, National Technical Institute for the Deaf in Rochester, New York, USA, Jan. 2007.
Reference_request_John_Allen_Payne_npl.pdf An email request for the inventor to use the NPL compiled by Professor John-Allen Payne, and his affirmative reply, the said NPL contained in the supplied reference historic_deciphering_01_npl.pdf.
List_Of_NPL_And_Computer_Related_Files_Submitted.pdf Listing of file names, sizes in bytes, and the dates, for twelve NPL and computer files being submitted with this patent application, as viewed in Microsoft Windows XP prompt boxes.

* cited by examiner

*Primary Examiner* — Brandon Hoffman
*Assistant Examiner* — Michael D Anderson
(74) *Attorney, Agent, or Firm* — Fox Rothschild, LLP; Dennis M. Carleton

(57) ABSTRACT

A piece of software code, as well as a series of semi-random character strings are embedded into a copy of a software application. The application executes the embedded code on activation and may also invoke the embedded code periodically thereafter. The embedded code generates a knowledge string from a seed string and then generates an activation code from the seed string and the knowledge string. The activation code is checked against an externally-supplied code to ensure that the codes match, indicating a non-pirated copy of the software application.

26 Claims, 24 Drawing Sheets

Figure 8 array positions 60 → 0 1 2
@caps → | A | B | C |
59

61 → $caps[0] = A
$caps[1] = B
$caps[2] = C array positions 63 → 0 1 2
@caps_pos_normal → | 0 | 1 | 2 |
62

64 → $caps_pos_normal[0] = 0
$caps_pos_normal[1] = 1
$caps_pos_normal[2] = 2
so
$caps[$caps_pos_normal[0]] = $caps[0] = A
$caps[$caps_pos_normal[1]] = $caps[1] = B
$caps[$caps_pos_normal[2]] = $caps[2] = C array positions 66 → 0 1 2
@caps_pos_scram → | 2 | 0 | 1 |
65

67 → $caps_pos_scram[0] = 2
$caps_pos_scram[1] = 0
$caps_pos_scram[2] = 1
so
$caps[$caps_pos_scram[0]] = $caps[2] = C
$caps[$caps_pos_scram[1]] = $caps[0] = A
$caps[$caps_pos_scram[2]] = $caps[1] = B

Figure 12

99 → Let the sum modulus result be decimal 8.

$kuicstring_random_positions_table[8] = a627

Hex letter a is equivalent to 10 decimal. We therefore want the kuicstring characters from $kuicstring positions 10, 6, 2 and 7.

Let $kuicstring = IFFIRBTFQLPSUSIDMWMI $kuicstring[$uicstring_position_numbers[10]] = $kuicstring[13] = S
$kuicstring[$uicstring_position_numbers[6]]  = $kuicstring[6]  = T
$kuicstring[$uicstring_position_numbers[2]]  = $kuicstring[1]  = F
$kuicstring[$uicstring_position_numbers[7]]  = $kuicstring[0]  = I A necessary condition for the acstring to be considered valid is that $kuicstring letters S, T, F and I all exist within it, and exist at the acstring positions determined elsewhere.

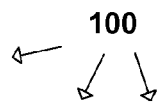
100

The diguising letter =
  $uicstring_letterfy_table[$uicstring_letterfy_table_positions[$number]]

Where $number will successively be 1, 1, 2, 2, 2, 3

$uicstring_letterfy_table[$uicstring_letterfy_table_positions[1]]
                                = $uicstring_letterfy_table[6] = I
$uicstring_letterfy_table[$uicstring_letterfy_table_positions[1]]
                                = $uicstring_letterfy_table[6] = I
$uicstring_letterfy_table[$uicstring_letterfy_table_positions[2]]
                                = $uicstring_letterfy_table[1] = F
$uicstring_letterfy_table[$uicstring_letterfy_table_positions[2]]
                                = $uicstring_letterfy_table[1] = F
$uicstring_letterfy_table[$uicstring_letterfy_table_positions[2]]
                                = $uicstring_letterfy_table[1] = F
$uicstring_letterfy_table[$uicstring_letterfy_table_positions[3]]
                                = $uicstring_letterfy_table[2] = Q

Figure 15

$kuicstring[$uicstring_position_numbers[0]]  = $CM1  = I
$kuicstring[$uicstring_position_numbers[1]]  = $CM2  = I
$kuicstring[$uicstring_position_numbers[2]]  = $CD1  = F
$kuicstring[$uicstring_position_numbers[3]]  = $CD2  = F         ← 104
$kuicstring[$uicstring_position_numbers[4]]  = $Cm1  = F
$kuicstring[$uicstring_position_numbers[5]]  = $Cm2  = Q
$kuicstring[$uicstring_position_numbers[6]]  = $C[0]  = T
$kuicstring[$uicstring_position_numbers[7]]  = $C[1]  = I
$kuicstring[$uicstring_position_numbers[8]]  = $C[2]  = U
$kuicstring[$uicstring_position_numbers[9]]  = $C[3]  = W
$kuicstring[$uicstring_position_numbers[10]] = $C[4]  = S
$kuicstring[$uicstring_position_numbers[11]] = $C[5]  = P
$kuicstring[$uicstring_position_numbers[12]] = $C[6]  = B
$kuicstring[$uicstring_position_numbers[13]] = $C[7]  = I
$kuicstring[$uicstring_position_numbers[14]] = $C[8]  = R
$kuicstring[$uicstring_position_numbers[15]] = $C[9]  = M
$kuicstring[$uicstring_position_numbers[16]] = $C[10] = M
$kuicstring[$uicstring_position_numbers[17]] = $C[11] = S
$kuicstring[$uicstring_position_numbers[18]] = $C[12] = D
$kuicstring[$uicstring_position_numbers[19]] = $C[13] = L

Figure 16

$uicstring_position_numbers[0] = 3
$uicstring_position_numbers[1] = 19         ← 105
$uicstring_position_numbers[2] = 1

Therefore $kuicstring[$uicstring_position_numbers[0]] = $kuicstring[3] = $CM1 = I
$kuicstring[$uicstring_position_numbers[1]] = $kuicstring[19] = $CM2 = I
$kuicstring[$uicstring_position_numbers[2]] = $kuicstring[1] = $CD1 = F

Figure 17

```
$CM1 = $kuicstring[$uicstring_position_numbers[0]]  = $kuicstring[3]  = I
$CM2 = $kuicstring[$uicstring_position_numbers[1]]  = $kuicstring[19] = I
$CD1 = $kuicstring[$uicstring_position_numbers[2]]  = $kuicstring[1]  = F
$CD2 = $kuicstring[$uicstring_position_numbers[3]]  = $kuicstring[7]  = F
$Cm1 = $kuicstring[$uicstring_position_numbers[4]]  = $kuicstring[2]  = F
$Cm2 = $kuicstring[$uicstring_position_numbers[5]]  = $kuicstring[8]  = Q
$C1  = $kuicstring[$uicstring_position_numbers[6]]  = $kuicstring[6]  = T
$C2  = $kuicstring[$uicstring_position_numbers[7]]  = $kuicstring[0]  = I
$C3  = $kuicstring[$uicstring_position_numbers[8]]  = $kuicstring[12] = U
$C4  = $kuicstring[$uicstring_position_numbers[9]]  = $kuicstring[17] = W
$C5  = $kuicstring[$uicstring_position_numbers[10]] = $kuicstring[13] = S
$C6  = $kuicstring[$uicstring_position_numbers[11]] = $kuicstring[10] = P
$C7  = $kuicstring[$uicstring_position_numbers[12]] = $kuicstring[5]  = B
$C8  = $kuicstring[$uicstring_position_numbers[13]] = $kuicstring[14] = I
$C9  = $kuicstring[$uicstring_position_numbers[14]] = $kuicstring[4]  = R
$C10 = $kuicstring[$uicstring_position_numbers[15]] = $kuicstring[18] = M
$C11 = $kuicstring[$uicstring_position_numbers[16]] = $kuicstring[16] = M
$C12 = $kuicstring[$uicstring_position_numbers[17]] = $kuicstring[11] = S
$C13 = $kuicstring[$uicstring_position_numbers[18]] = $kuicstring[15] = D
$C14 = $kuicstring[$uicstring_position_numbers[19]] = $kuicstring[9]  = L
```

Figure 18

YYYYMMDDHHmm = 200611221924 ←—107
Representing November 22, 2006, 19:24

Disguising Letter =
   $acstring_letterfy_table[$acstring_letterfy_table_positions[$number]]

$CY1 = $acstring_letterfy_table[$acstring_letterfy_table_positions[2]]
                  = $acstring_letterfy_table[0] = P
$CY2 = $acstring_letterfy_table[$acstring_letterfy_table_positions[0]]
                  = $acstring_letterfy_table[1] = E
$CY3 = $acstring_letterfy_table[$acstring_letterfy_table_positions[0]]
                  = $acstring_letterfy_table[1] = E
$CY4 = $acstring_letterfy_table[$acstring_letterfy_table_positions[6]]
                  = $acstring_letterfy_table[7] = I and so on, to get $CY1 = P, from numeral 2
$CY2 = E, from numeral 0
$CY3 = E, from numeral 0
$CY4 = I,  from numeral 6
$M1  = J,  from numeral 1
$M2  = J,  from numeral 1
$D1  = P,  from numeral 2
$D2  = P,  from numeral 2
$H1  = J,  from numeral 1
$H2  = H,  from numeral 9
$m1  = P,  from numeral 2
$m2  = K,  from numeral 4

$acstring[$acstring_position_numbers[0]]  = $acstring[19] = $CY1   = P
$acstring[$acstring_position_numbers[1]]  = $acstring[13] = $CY2   = E
$acstring[$acstring_position_numbers[2]]  = $acstring[7]  = $CY3   = E
$acstring[$acstring_position_numbers[3]]  = $acstring[16] = $CY4   = I
$acstring[$acstring_position_numbers[4]]  = $acstring[18] = $CM1   = J
$acstring[$acstring_position_numbers[5]]  = $acstring[8]  = $CM2   = J
$acstring[$acstring_position_numbers[6]]  = $acstring[11] = $CD1   = P
$acstring[$acstring_position_numbers[7]]  = $acstring[9]  = $CD2   = P
$acstring[$acstring_position_numbers[8]]  = $acstring[1]  = $CH1   = J
$acstring[$acstring_position_numbers[9]]  = $acstring[14] = $CH2   = H
$acstring[$acstring_position_numbers[10]] = $acstring[2]  = $Cm1   = P
$acstring[$acstring_position_numbers[11]] = $acstring[12] = $Cm2   = K
$acstring[$acstring_position_numbers[12]] = $acstring[4]  = $RAND1 = S
$acstring[$acstring_position_numbers[13]] = $acstring[10] = $RAND2 = T
$acstring[$acstring_position_numbers[14]] = $acstring[5]  = $RAND3 = F
$acstring[$acstring_position_numbers[15]] = $acstring[3]  = $RAND4 = I
$acstring[$acstring_position_numbers[16]] = $acstring[0]  = $TAC1  = C
$acstring[$acstring_position_numbers[17]] = $acstring[6]  = $TAC2  = U
$acstring[$acstring_position_numbers[18]] = $acstring[15] = $TAC3  = J
$acstring[$acstring_position_numbers[19]] = $acstring[17] = $TAC4  = D

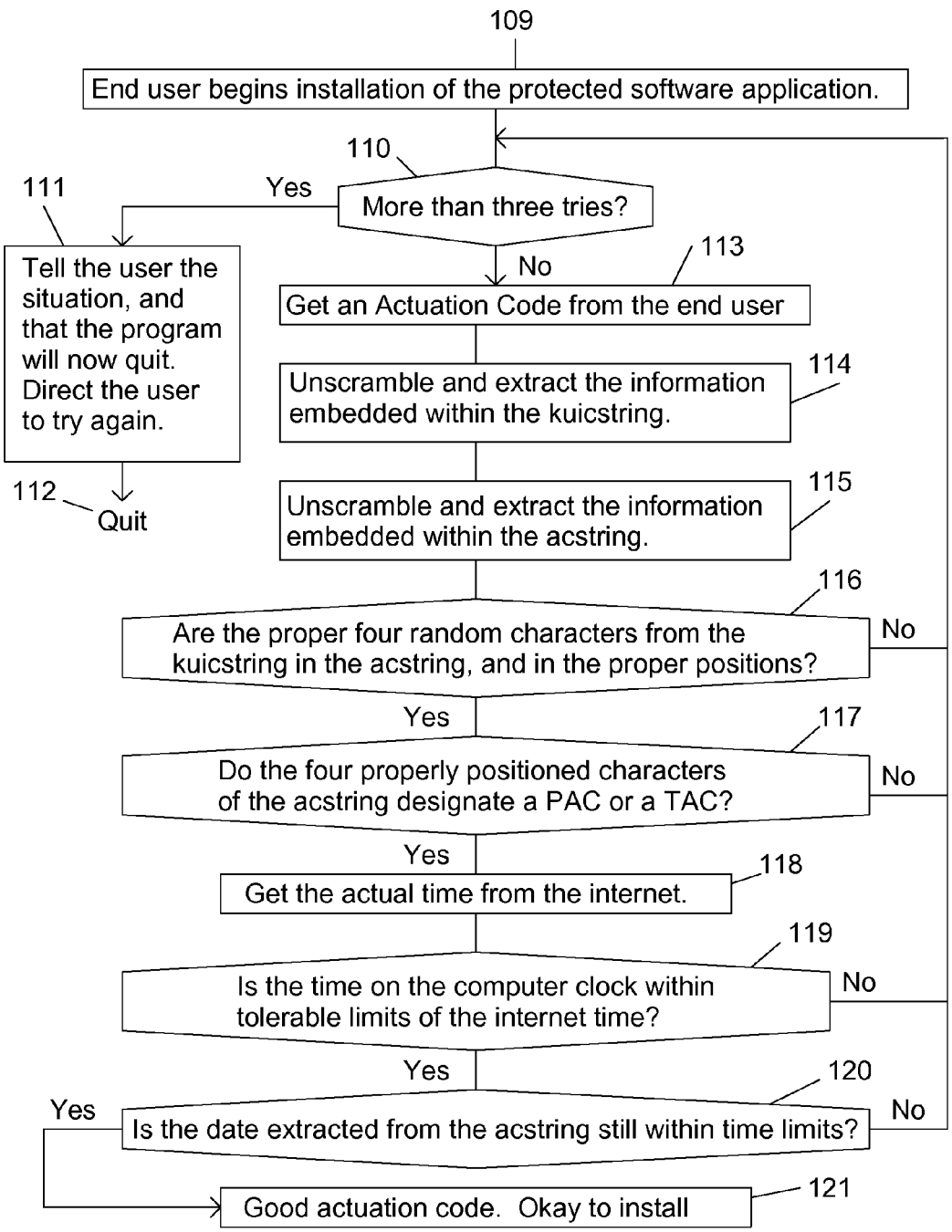

Figure 22

Vendor/Manufacturer does this

Variation on information carried within kuic string

This is another more detailed view of Figure 6, which is the generation of the kuicstring. This time, instead of the Random Letters of item 101 of Figure 14, desired information is used. As shown, the desired information is scrambled by yet another table of charcter string positions. As always, the table and string lengths shown are for demonstration purposes. Any lenghs can be used.

Information from two sources, at Step 4 and Step 5, are scrambled by Table of Character String Positions #2, into the intermediate string, before forming the final kuic string.

Table of Character String Positions #2
Random Numbers
0 1 2 3 ...  ... 18 19

The extracted 6 letters are placed into the intermediate string in positions given by the random numbers table of character string positions #2 above.

Additional information goes into the intermediate string, positions given by the table of character string positions #2 above.

Letterfy Table
(item 80 of Figure 10)
(Random Letters)

W F Q N D Z I G K Y
0 1 2 3 4 5 6 7 8 9

Step 3 The random letters in the array positions indicated by the random digits obtained in step 2, are extracted.

Step 4
Letters
(item 104 of Figure 15)

Step 5
Desired Information
(Was Random Letters)
0 1 2 3 ...  ... 12 13

I  Intermediate String
0 1 2 3 ...  ... 18 19

Table of Character String Positions #1
(Random Numbers)  (item 78 of Figure 10)

3 19 1 7 2 8 6 0 12 17 13 10 5 14 4 18 16 11 15 9
0 1 2 .. 6    15    ... 19

Table of Letterfy Positions (item 82 of Figure 10)
(Random Digits)

9 6 1 2 4 8 3 0 5 7
0 1 2 3 4 5 6 7 8 9

Step 2 The random digits that are in the positions indicated by the (in this example six) six IIII mm ss digits are extracted.

Step 6 Random numbers of this table are used to point into the positions of the intermediate string. The letters in those random positions are taken, one by one, and placed into the final string, sequentially, from the first to the last position.

Time  6 digets
Information
MM DD mm
11 22 23

Step 1 Starting digits are used, for example six digits from the digits of time of creation information.

(KUIC String)  (item 76 of Figure 10)
Knowledgeable Unique Internal Character String I F F I R B T F Q L P S U S I D M W M I  End
0 1 2 .. .. 6      15    ... 19  Goal

Generate Actuation Code

(Details of Figure 7)

Vendor/Manufacturer Side

Creating the actuation code (A.C). The outline of this part of the invention is also shown in Figure 7.

Figure 24B

From step 6

Step 7 (Last of items 52 & 53 of Figure 7)
Extract the letters from the kuic string above in the order given by the uicstring_random_positions_table (a627).

a -> 13 -> S
6 -> 6 -> T    The result is    STFI
2 -> 1 -> F
7 -> 0 -> I    (Also shown in Figure 12)

Step 8 We are now at items 54 and 56 of Figure 7 in the generation of the Actuation Code. This assumes a Temporary A.C. as in item 56 of Figure 7. Use the same sum mudulus (8), to extract four letters from the TAC_Table that are to be in the final A.C.

(Item 97 of Figure 11)
TAC_table

| JFJF | WQHG | BQFX | ... | CUJD | JWQH | IOUP | ... | | |
|------|------|------|-----|----------|------|------|-----|---|---|
| 0    | 1    | 2    | ... | 8    | 9    | 10   | ... | 14 | 15 |

Identical in form to kuic and PAC tables.

Get 12 digits from the current time in the form YYYYMMDDHHmm. To use the example from the specification, use November 22, 2006, 19:24, YYYYMMDDHHmm = 200611221924.

Step 9 (Item 57 of Figure 7)   YYYYMMDDHHmm = 200611221924   Could be any ordering desired 2 0 0 6 1 1 2 2 1 9 2 4

Step 10 (Item 57 of Figure 7)
Use the date digits as positions into the letterfy table positions array. Extract the contents of those positions. This is also shown in Figure 18.

acstring_letterfy_table_positions
(Item 93 of Figure 11)

| 1 | 9 | 0 | 2 | 3 | 8 | 7 | 5 | 6 | 4 |
|---|---|---|---|---|---|---|---|---|---|
| 0 | 1 | 2 | 3 | 4 | 5 | 6 | 7 | 8 | 9 | acstring_letterfy_table
(Item 91 of Figure 11)

Step 11 (Item 57 of Figure 7)
Use the digits extracted in step 10 as positions into the letterfy table.

| P | E | N | K | H | B | Z | I | Y | J |
|---|---|---|---|---|---|---|---|---|---|
| 0 | 1 | 2 | 3 | 4 | 5 | 6 | 7 | 8 | 9 |

Translation of first four date digits is below.
2 -> P
0 -> E    From Figure 18 the letters of the
0 -> E    translated digits are:
6 -> I     P E E I J J P P J H P K To step 12

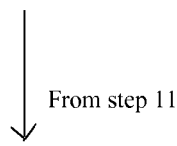
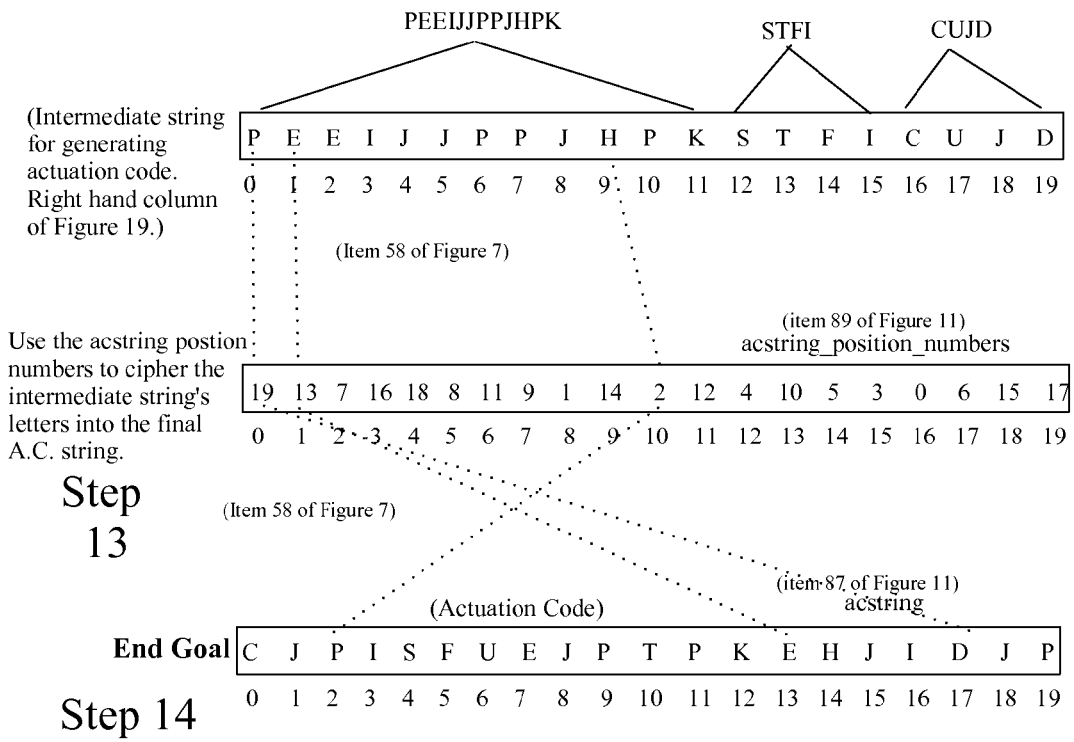

PREVENTION OF SOFTWARE PIRACY USING UNIQUE INTERNAL INTELLIGENCE WITH EVERY SOFTWARE APPLICATION COPY

FIELD OF THE INVENTION

The present invention relates to methods for preventing the piracy of software. In particular, a method whereby an internal knowledge of itself is built into the software itself using unique internal character strings and tables of unique characters and strings, and internal time information, and externally obtained time information, along with internal algorithms, so as to be able to validate multiple pieces of knowledge embedded within an externally entered activation code, whether the activation code is meant to be a temporary or a permanent activation code.

BACKGROUND OF THE INVENTION

Copy protection has received greater attention in the computer software industry. One approach is to use a nonstandard disk format for recording the program of real interest. Standard copying programs can only read or write data in standard format, making copying of this program impossible. While this approach prevents standard copy programs from copying the disk, an adversary can always make a bit for bit copy of the disk which will be executable by the computer.

Another approach to copy protecting computer programs is to put a small pin hole or other defect at a particular spot on the disk. The program being sold avoids using this ruined portion of the disk, but checks to make sure that that portion of the disk is, in fact, ruined. If it is ruined, the program continues its normal execution. If it is not ruined, then the program stops execution. Even a bit for bit copy of the program onto a new disk will not execute properly because there is hidden information on the disk—which part is ruined—which must be copied if the program is to execute properly.

An adversary can overcome this copy protection by one of two methods. First, he can determine which portion of the disk is checked and make sure it is ruined on the copy. Or, he can delete the part of the program which checks for the ruined portion of the disk. This produces a slightly shorter program which does everything of value to the user that the original program did, but this new version of the program can be copied without any special effort and used on all other base units without further modification to the program or the other base unit.

Another approach to copy protecting computer programs is to require a special piece of hardware to be attached to the computer that the end user software application can sense and/or to communicate with.

An adversary can overcome this copy protection by creating/pirating the special piece of hardware along with pirating the intended software application. Another disadvantage of this approach is that the special hardware adds to the overall cost to the end user. In addition, it is bothersome to the end user to be attaching or unattaching things to the computer, and also just keeping track of the devices for attachment, if there is more than one software application that has its own hardware piece for attachment.

Another approach to copy protecting computer programs is to require one or more communications over a network such as the internet, when the protection software senses it can communicate over the network, to verify that the running program is not pirated. If the said communication exists, a number of schemes based on communication with an external verification authority can be employed. One method includes, for example, monitoring software using encryption including digital signatures/certificates, which includes generating a key based on computer-specific information of a computer on which the software is installed and using the key to encrypt an authorization code which enables use of the software on the computer.

An adversary can overcome this copy protection by several methods. Many software programs simply do not need to attach to a communications network in order to run, so pirated software can run just fine on stand alone computers. Or, the pirate can simply remove the software that checks for attachment to the communications network. A rather simple way to circumvent this copy protection scheme is to change the port number with which the communications code is attempted. Most home computers get on the internet over a certain standardized address, called a port. A pirate can simply change the code in the spot where the port number can be specified. Communication will then be attempted over a port that does not work. An adversary can then create as many copies of the altered software as desired. Since the pirated software would then never succeed in attaching to the internet, it will never check to see if it is pirated software, and no external entity would therefore be able to check for it either.

Another approach to copy protecting computer programs is to have a manufacturer provide each customer for its program with two versions: the regular version is in a sealed envelope, the opening of which would constitute a purchase, and a degraded version, which only allow up to, say, 50 records per file for an application that needs to keep certain records per file. Within a 30 day trial period, the manufacturer allows the customer to return the regular version in its sealed envelope for a refund. This way, the customer can experiment with the degraded version to determine if he wants the full package.

One problem with such a scheme is that there is no copy protection, so that one dishonest customer can make as may copies as he wants of the regular version and give or sell them to acquaintances with similar base units—computers. These acquaintances can in turn give or sell copies to their acquaintances, etc. It may also be desirable for the customer to experiment with a full version of the program because certain customer-needed characteristics of the program perhaps can only be experienced with the full program, such as more than the said 50 records of the given example.

Another approach to copy protecting computer programs is a variation of the old public/private key idea. The idea is to simply utilize some information, say, a unique character string internal to the program, to be matched. The user would be communicated that same string externally upon purchase; and upon entering the string during the installation phase, there would be an internal/external match which would then permit the software to install. Variations of this are to have more than one such string internal to the program so that more than one code could be externally entered for matching. Another variation would be to have an internal string such that only a certain number of the characters in it need to match, or some other scheme whereby a sufficiency of matching is obtained.

The problem with all such variations is that again, only a single matched key for a copy of the software needs to be known, from which a software pirate can make as many copies as desired. This is also true of any scheme that is based upon the software application having a unique identification code for each authentic copy of such software application, whether such key or keys are embedded within the application or not.

Another idea for protecting software is fear of prosecution. If a copy of a software application were pirated, then the culprit could be found by tracing back the private key, if that were part of the matching keys antipiracy scheme used, or one or more unique strings/keys, if that were the antipiracy scheme used, to the original user who revealed them. Fear of prosecution might discourage many users from revealing the private keys or strings.

Unfortunately a pirate would probably not pirate his own copy of a program. He would ordinarily steal it, or provide fake identification when purchasing the original copy. Prosecuting a pirate based upon finding the source of the original pirated copy may not even be possible because a software program can be stolen from an unsuspecting victim. Even if it were proven that the original source person was in conspiracy with the pirates, prosecution may be very expensive. A small software company may not be able to afford it.

Another approach to copy protecting computer programs is biometric based method for software distribution. For example, personal fingerprint information can be embedded into the software application at the time of purchase. With each use the user can use a device to enter his finger into, with the results being communicated to the software application for a match, allowing the software application to be run. There can also be some sort of central authority to check biometric information.

One problem with biometric schemes is that gathering the biometric data for each purchaser is not currently feasible. Also, gathering the biometric data for a purchaser would be time consuming and expensive. Embedding the biometric data into the software is also time consuming. As for a central authority keeping biometric data, that is too personal. People do not like other people having their biometric data whether it were people in a company or people in a government office. This is yet one more difficulty with the biometric scheme.

Another approach to copy protecting computer programs is to simply generate a group of character sets for actuation codes that are both never repeating within a certain period of time and difficult to guess.

An adversary can overcome this copy protection because again once a character set is found out for a particular copy of a software application, say, by viewing the code using a binary to hex editor, a pirate can create as many copies of the software application as desired and pass along the same needed character set to each unauthorized user.

It is very difficult, if not impossible, to allow more than one machine to use the same copy of an application code and yet be reasonably sure that the application code is not being pirated. This is certainly true of each of the schemes discussed so far. On the other hand software applications would be more appealing to purchasers if the purchasers knew they could legally install the same copy of the software application on all of the machines they have in their home, and yet inhibit the spread of illegal copies to other people's machines. The author of this patent application knows of no antipiracy scheme that addresses this concern, other than the current invention itself.

Another approach to copy protecting computer programs is to use some form of cryptography. There can be a lot of random and pseudo-random characters in what are called keys. The keys are used to decipher encrypted information. The use of randomness or pseudo-randomness in the decryption scheme to provide a level of security to the scheme was known to be used in cipher machines since the 1920s, most famously by Nazi Germany before and during World War II with their Enigma machine. Modern forms of public/private key encryption techniques are based on the paper New Directions in Cryptography by Whitfield Diffie and Martin Hellman, 1976, as seen in the periodical IEEE Transactions on Information Theory, all using random and/or pseudo random characters/keys. There are many variations on the techniques.

The biggest problem a cryptography based antipiracy scheme is that, once a key is deciphered, it will always be available. It only takes a single known private key for a copy of a program to be known. From then on any amount of copies of that copy can be made, all using the same public/private key pair. This is true of any type of key no matter how many random or pseudo-random characters are used in a key.

Cryptography is a primary basis for this invention. However, cryptography is only one of the parts of this overall invention. To circumvent the antipiracy measures and distribute installable copies, one must know more than just the key for the copy, as will be explained in the detailed explanation section of this invention. For now, the specific old cryptographic ideas that this invention uses will be described.

A primary basis of this invention is the invention in 1914 by Gilbert Sanford Vernam. The Vernam system used random characters to disguise letters and numbers. Gilbert Vernam's Cipher Machine worked like an ordinary teletypewriter except that it used three paper tapes instead of just one. On the first tape, the sender would type a message in the form of holes and spaces. On the second tape, the sender would type random characters. Vernam's Cipher Machine would then work to combine the holes and spaces of the message tape with the holes and spaces of the random-character tape using a special addition called Modulo-2. This action produced the third tape containing the enciphered message (cipher), which was absolutely unbreakable. The cipher would then be transmitted securely to a receiving teletypewriter and saved on a paper tape.

Later in history, during WWII, the Germans used the same principle with a single notepad, and is more indicative of how this invention utilizes encryption. A German diplomat wanting to encipher a message would write his message above a line of random numbers on a page of his pad. Then, for each letter of his message, he would count forward in the alphabet the number of letters indicated by the number under it. He would write the new letters below the numbers. The new letters would be the enciphered message, or simply the cipher.

Diplomats receiving the cipher would write the letters of the cipher above an identical line of random numbers on identical pages of their pads. Then, for each letter of the cipher, they would count backward in the alphabet the number of letters indicated under it. Finally, they would write the new letters below the numbers. The new letters would be the original message. After a message was ciphered and deciphered, that page of the pad would be discarded. Each page was used only once so as not to create a repetitive pattern that a skilled enemy cryptologist might detect. Hence, this system came to be called the one-time pad.

The later WWII Lorenz Cipher Machine is based on the same Vernam system. It used pseudo random instead of truly random characters because, being mechanical, it could not produce all possible combinations of characters. The Lorenz Cipher Machine worked on the same principle as Vernam's machine's enciphering with random characters using the same modulo-2 addition as Vernam's machine, then transmitting the cipher to a receiving machine, which would decipher the cipher in the same way with identical random characters; but rather than the operator typing them onto paper tape as he did on Vernam's machine, the Lorenz operator would manually set 501 finger switches on twelve steel rotors.

The primary ideas this invention uses from the Vernam and Lorenz systems are:

The disguising of characters with other characters, and reversing it to get back the original information.

Having the disguising characters be chosen randomly, or pseudo randomly.

Allowing only the sender and the receiver to have the deciphering equipment, the equipment being the pad with numbers and a pencil in the case of WWII diplomats, which liken to the current invention's computers with their unique random and pseudo random tables and strings.

In this invention the deciphering information of the Lorenz finger switches and rotors is contained instead within characters, strings of characters, and also tables of information of differing types, within computer memory.

BRIEF SUMMARY OF THE INVENTION

The present invention provides a new and novel system and method for protecting a computer software program from unauthorized use.

With this invention, each copy of a software application will be different within itself in ways known only to itself and to the original creator of the application software that utilizes this invention. Given such knowledge, the original creator can recreate a new temporary or permanent actuation code for the given copy, and only that particular copy will be able to recognize it as an activation code and make checks on that activation code to insure it's validity, both at installation time and during the running of the application program after installation has been done. In addition, there is a time window within which an actuation code is valid for use in installing the intended application program.

In accordance with the present invention, there is provided a method of preventing unauthorized copies of application software from installing and/or running by utilizing intelligence embedded within characters, character strings and tables, which are themselves unique to each and every copy of a protected end user software application, along with dynamically created actuation codes that are themselves unique to each and every copy of a protected end user software application that utilizes this invention. An actuation code would work for only one copy of an end user application, and could be utilized for installing an end user application only within a manufacturer specified time frame, whether the actuation code was temporary or permanent.

The method uses a combination of random and pseudo-random characters, strings of such characters, disguised time and date information, and differing disguising techniques such as using more than one base number system.

For any given string with information embedded within it, each character position within the character string has its own interpretation. The interpretation of the characters found in each said position changes randomly with each copy of a software application program that is protected by this invention. The randomness of positional interpretation is not related to the randomness of the characters found in the said given positions. This includes the characters that are used to represent time and date information, and is true for the dynamically created external actuation codes of this invention as well as for the internal strings and tables of this invention.

Temporary activation codes are invalidated after a predetermined time which in the current embodiment of the invention is set in days.

A permanent actuation code is valid for installation only within a predetermined period, which in the current embodiment of the invention is set for days, for example only for the day of issuance. A permanent activation code will allow a software application to install and then run forever, assuming the permanent activation code was used to install the application code before the set time for the activation code had expired.

The ability to distinguish between a temporary and a permanent actuation code, or neither, is also done using randomized strings and tables, which randomization and interpretations are also unique to each copy of a program.

The invention also provides the developer of an application program that utilizes this invention with antipiracy self checking that will make quick, on-user-machine antipiracy checks. The invocation call or calls to the antipiracy code based on the invention can be embedded throughout the developer's application code, in as many places as desired, including any specialty or hidden application code developed by someone utilizing this invention, to thwart attempts by software pirates to simply remove the antipiracy code by rewriting the said application program in just one place.

This invention also provides the developer of an application code that utilizes this invention with a method for invoking code to make a quick on-machine antipiracy check to check the permission-to-install time limits, to thwart attempts by software pirates to simply modify the developer's code to give long permission-to-install times to actuation codes. Like the calls to other antipiracy checks, the permission-to-install time limits can be stored in as many places as desired throughout the developer's application code.

In all cases, once a developer's application code that incorporates this invention is installed, the self re-checking of the actuation code is made possible because the actuation code would be stored in a hardware location such as a computer hard drive. Access to such a stored actuation code will not help a software pirate to pirate the software because the usefulness of the actuation code for installing the software has a short time period, after which the software will no longer be installable.

This invention is such that it will not appreciably assist a pirate to read the details of this patent because the major strength of this invention does not lie in the overall schemes or algorithms of the invention. Rather, it lies in the details of the embedded knowledge, and those details change randomly with each and every copy of a protected software application. The time and effort involved in tracking down and finding all of the needed characters, tables and strings, and discerning how to interpret them will still be very time and effort intensive. Even if a pirate were successful the effort would result in the ability to install or reinstall only the single program copy from which the pirate obtained the needed characters, and even then the installability would only be for a short time duration. Except perhaps for very high priced software applications, considering the time and effort required to illicitly obtain a new actuation code, it would be much more cost efficient to simply purchase the desired application program.

A software pirate is prevented from installing a protected application program with an expired password by simply turning back the computer clock.

BRIEF DESCRIPTION OF THE DRAWINGS

A complete understanding of the present invention may be obtained by reference to the drawings when considered in conjunction with the subsequent detailed description, in which, in the current embodiment of the invention:

FIG. 8 shows the array notation used using examples of string and tables.

FIG. 12 shows the use of a sum's modulus, random positions table and a kuicstring.

FIG. 13 shows the disguising of the digits for November 22, 23 minutes, with characters using an interposing scrambled array of numbers.

FIG. 15 shows a kuicstring being put together from twenty characters using an interposing scrambled array of numbers.

FIG. 16 is a further breakdown of putting together a kuicstring

FIG. 17 depicts extracting all twenty characters from a kuicstring.

FIG. 18 depicts changing numbers into letters for an acstring.

FIG. 19 depicts putting twenty characters into an actuation code string—acstring for short.

FIG. 20 depicts the interaction of an end user installing a software application that is protected by this invention, activation code entry, and checking the actuation code.

FIG. 22 is a flow chart showing the generation of a kuicstring from a seed string, wherein the intermediate string is padded with characters containing non-random information.

FIGS. 24a, 24b and 24c is a flow chart showing the generation of an activation code containing varying amounts of information.

Figure 1:
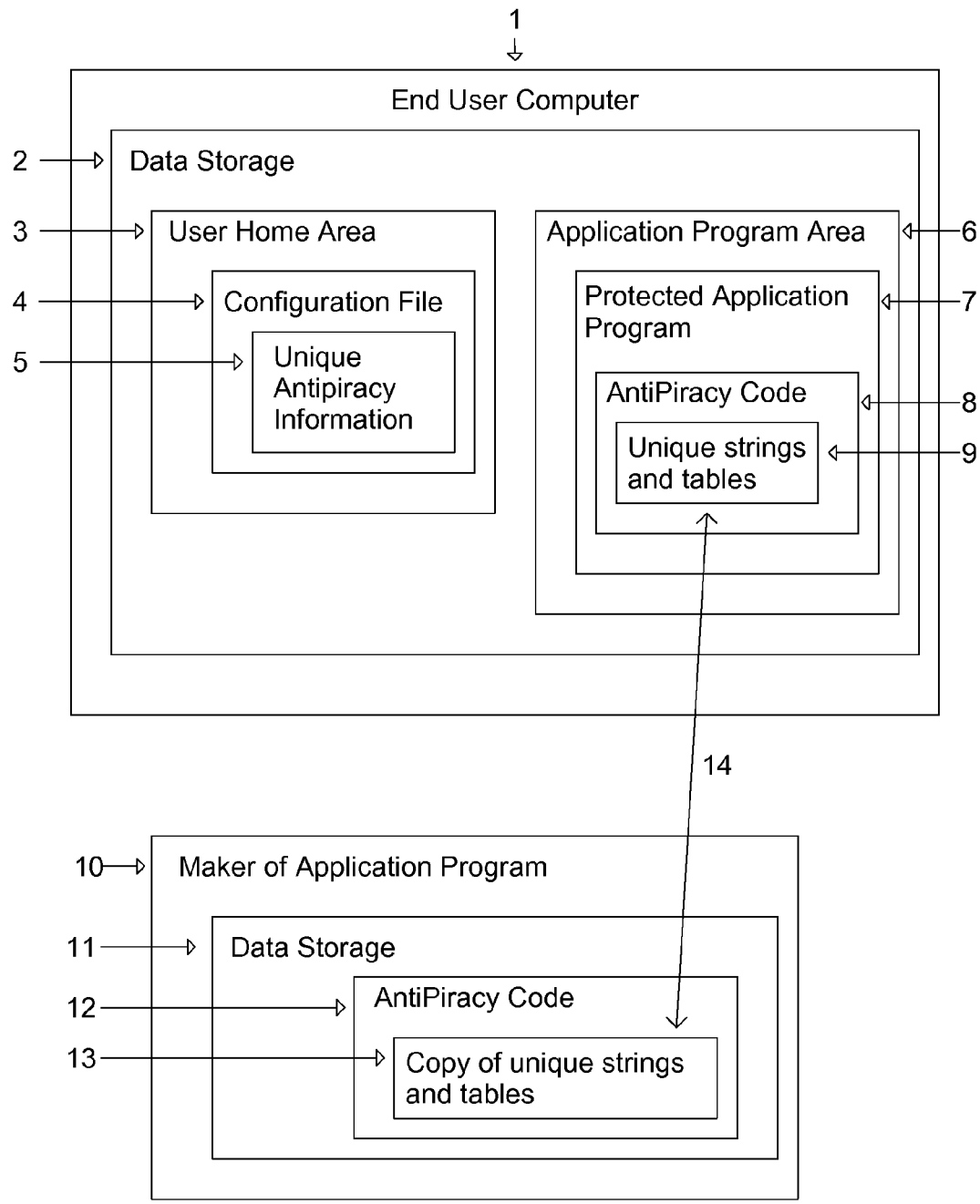
FIG. 1 shows a typical resulting scenario when using the invention.

While the invention is susceptible to various modifications and alternative forms, a specific embodiment thereof has been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE INVENTION

To avoid confusion some terms need to be defined and their use clarified.

Program, End User Program, End User Product, Application Program. The meanings are the same. Examples of end user programs are games, accounting programs, backup programs, word processing programs, data base programs and so on. In other words, pretty much any computer software or software/hardware combination that someone might use.

Protected Program, Protected Application Program. A Protected Program is an Application Program that is protected with this invention.

Code. The term code is used in two contexts. One is program code written in a computer language so that a computer understands and runs it. The second is in the context of the term Actuation Code. The meaning of the word code will be clear in the contexts in which it is used.

Program Code, Code Files. An application program is made up of one or more files containing code that the computer understands. Hence code files.

Vendor, Developer, Publisher, Manufacturer, Maker. The meanings are the same. They mean the maker of an end user program such as a software developer or a company. Such a developer would include the programmer who would utilize this invention, incorporating it into his own end user product to prevent the end user product from being pirated.

Character, characters. Any character permitted to be used by the operating system that the end user program would run on. An example of a small string of characters is "a8}V5wp$E". To make viewing the explanations and examples easier, only the letters A through Z, both small and capitalized, and the numerals 0 through 9 will be utilized. These are here designated A-Z, a-z, 0-9.

Internal. Internal means internal to the vendor's application software. An internal character string designates a string of one or more characters that is internal to a said vendor program. Once the invention is utilized by a developer, all of the program code of the invention would be internal to the developer's overall application software.

Unique. The antipiracy characters, character strings and arrays used in each copy of a software application that utilizes this invention are different from that of any other copy. A character string with just ten characters, if only capital letters were used, gives over 100 trillion permutations.

Knowledge, Self Knowledge. The knowledge being referred to is about how to interpret characters within strings, how to decide what characters represent different things such as time and date information, and so on.

uicstring, Unique Internal Character String. A uicstring is a Unique Internal Character String, with each of the four words of the phrase Unique Internal Character String being defined as above.

kuicstring, Knowledge Unique Internal Character String. A kuicstring is a uicstring that has knowledge embedded within it.

duicstring, Dummy Unique Internal Character String. A duicstring is a uicstring that has no special antipiracy knowledge embedded within it. It is used strictly for identification purposes. It can also carry any information that a vendor may desire such as characters that represent something about himself.

AC, PAC, TAC. AC is short for Activation Code. PAC is short for Permanent Activation Code. TAC is short for Temporary Activation Code. If an end user utilizes a PAC when installing the vendor software, the vendor software will run forever. If a TAC is used, the vendor software will run only for as many days as specified by the vendor. All activation codes are of length twenty in the current embodiment.

Scramble, Scrambled, Scrambling. Standard dictionary definition, as in mixed up, or put out of order. For example one scrambling of the ordered numbers 0, 1, 2, 3, could be 3, 1, 0, 2.

The description of this invention will be done by starting with broad overviews where major pieces of the invention are identified. The invention is made up of a number of separate said pieces, which, when taken as a whole, constitute the invention. After the pieces are identified, the pieces will be reviewed in greater detail.

Attention is now directed to the overview of FIG. 1 which shows where the invention is applied in terms of where it fits in from the point of view of a vendor who utilizes the invention, and that of the end user, and where it fits into the hardware of both a vendor and an end user, and also where the invention fits in terms of it's placement within the program code of a software application to be protected. Item 1 depicts an End User Computer. Item 2 is the Data Storage area on that computer. Within the data storage area are shown a User Home Area 3 and another area, the Application Program Area 6, where application programs are stored on the user's computer. Having a separate area in which an application program may reside is an operating system idea, as is the idea of a separate home area for a particular user. Both ideas will be assumed for purposes of explanation.

Within the Application Program Area 6 is shown an application program that is protected by this invention, shown as the Protected Application Program 7. Within the Protected Application Program 7 is the Antipiracy Code 8 of this invention. The Antipiracy Code 8 remains the same from protected program to protected program. However, the Unique strings and tables 9 change with each protected program. Within the User Home Area 3 is the Configuration File 4 which holds, perhaps amongst other things, Unique Antipiracy Information 5, which is unique to the given copy of the said Antipiracy Code 8. The Configuration File 4 really could be anywhere in the data storage area, but typically it would be somewhere in the logged on user's space. The antipiracy code of the invention checks the stored configuration file information periodically whenever any protected program is run. There typically would be one configuration file per protected application program on any given end user machine. However, a vendor could choose to share a single configuration file, especially if the invention were used to protect more than one application program from a single vendor.

The Antipiracy Code 8 is what a software developer would create in accordance with this invention. The Antipiracy Code 8 would be shipped by the developer as an integral part of the code of the said Protected Application Program. The Unique Antipiracy Information 5 is dynamically created in conjunction with the Antipiracy Code 8 and the Unique strings and tables 9, and then written to the Configuration File 4 at installation time.

Just to be clear, it is only the data that the Antipiracy Code 8 uses that changes from protected program to protected program. Namely, the Unique strings and tables 9 that come with a protected program, and the Unique Antipiracy Information 5 that gets written when a protected program is installed.

The vendor of an application program that utilizes this invention is depicted in FIG. 1 as the Maker of Application Program 10. The antipiracy code, strings and tables resulting from this invention would be stored in whatever Data Storage 11 area the vendor needed. The Antipiracy Code 12, that is to say, the executable code, is always the same. Only the data that is used changes. Namely the copy of the Unique Strings and tables 13.

The line 14 is meant to imply that the Unique strings and tables 9 that the end user has on his hardware will be identical to that stored 13 by the vendor.

Now attention is directed to vendor scenarios in which copies of a protected program might be generated, distributed and used. The overviews are shown in FIG. 2, FIG. 3 and FIG. 4 and will be used to give the reader a better idea of where this invention fits in the overall process of protecting an application program.

Figure 2:
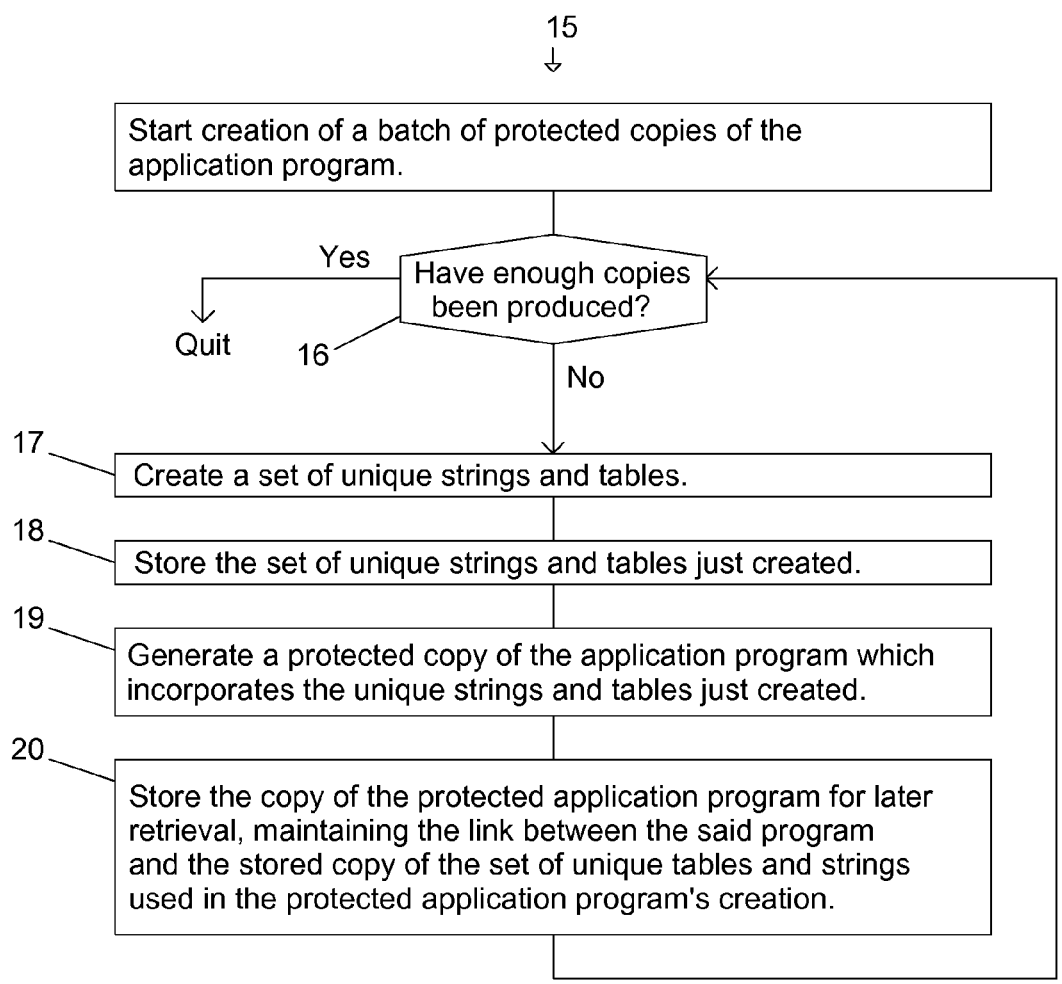
FIG. 2 is an overview of the creation of a batch of unique strings and tables, and the generation of protected copies of an application program that uses them.

FIG. 2 depicts our first scenario, a vendor creating a batch of copies of a protected application program, starting at 15. The question of item 16, Have enough copies been produced, assumes the vendor has decided on how many copies to keep for later distribution, and can know how many are already on hand. If there are already enough the process quits. If more need to be needed, the process continues through items 17, 18, 19 and 20. The key idea here is that a unique set of strings and tables are created, as in 17, and that those strings and tables get incorporated into a copy of the application program to be protected, as in 19. The unique strings and tables are stored as in 18. The newly generated protected copy gets stored as in 20.

The vendor's system needs to know which stored copy of the strings and tables are to be associated with which copy of a stored protected program. The Dummy Unique Internal Character String, or duicstring for short, is used for this. In the current embodiment of the invention it has been made a string of 16 random characters, and four additional characters that identify something about the vendor. The four additional characters are made up of two characters to represent which vendor made the protected program, in case there are more than one vendor doing so, and two characters for identifying for a vendor which machines or personnel created the program within his organization. The duicstring in the current embodiment was done in this manner to show that the duicstring can be put to different uses. In any case, besides being known to both the manufacturer and the end user, the duicstring is usually embedded within the protected program. An end user would use the duicstring in normal communications with a vendor about the particular protected program the end user has. For example if an end user needed a new actuation code the duicstring is what he would provide to the vendor, along with any other desired information such as personal or financial information, in order to get the new actuation code.

Figure 3:
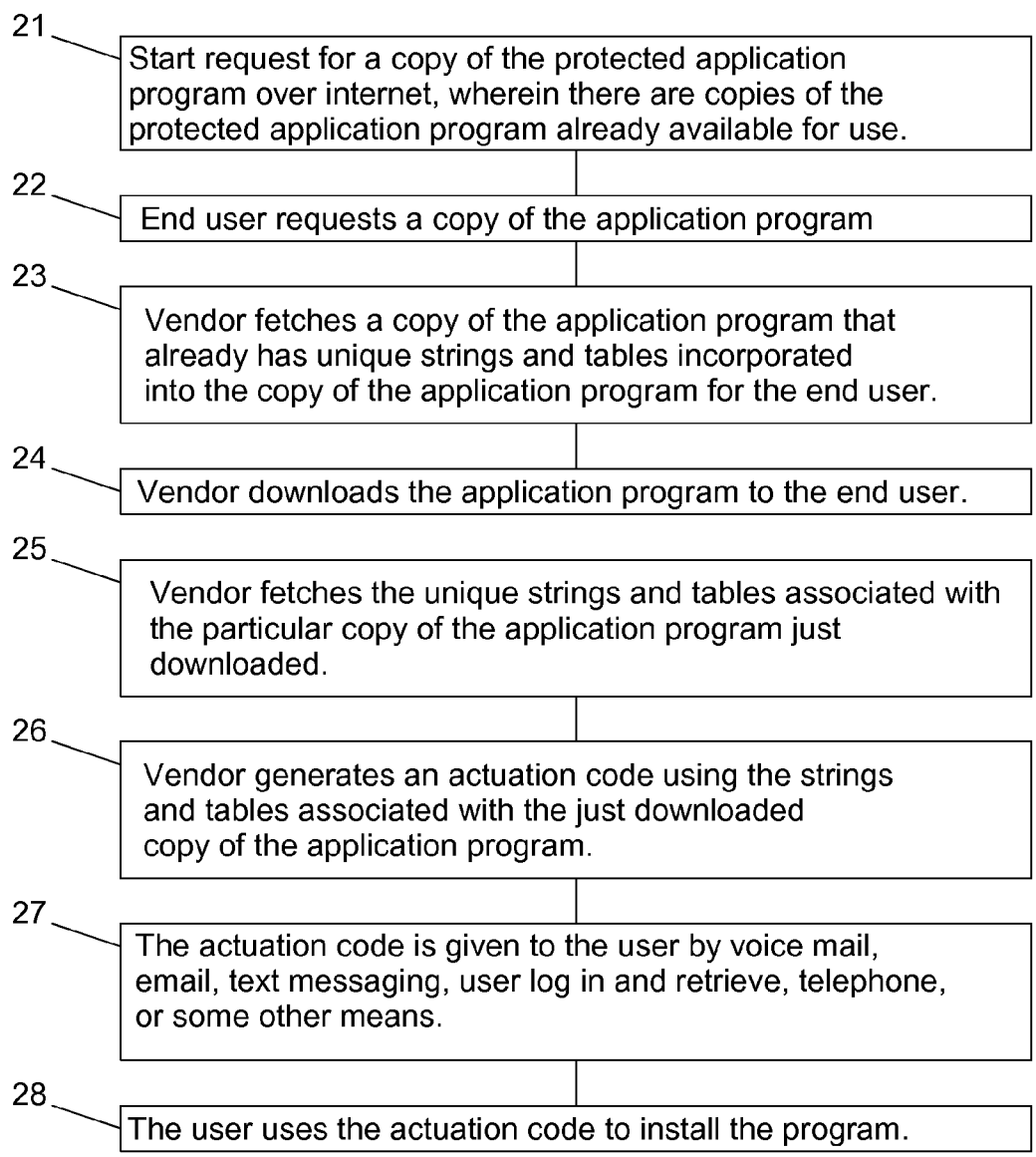
FIG. 3 depicts a scenario wherein an already created protected program may be obtained by a user.
Figure 4:
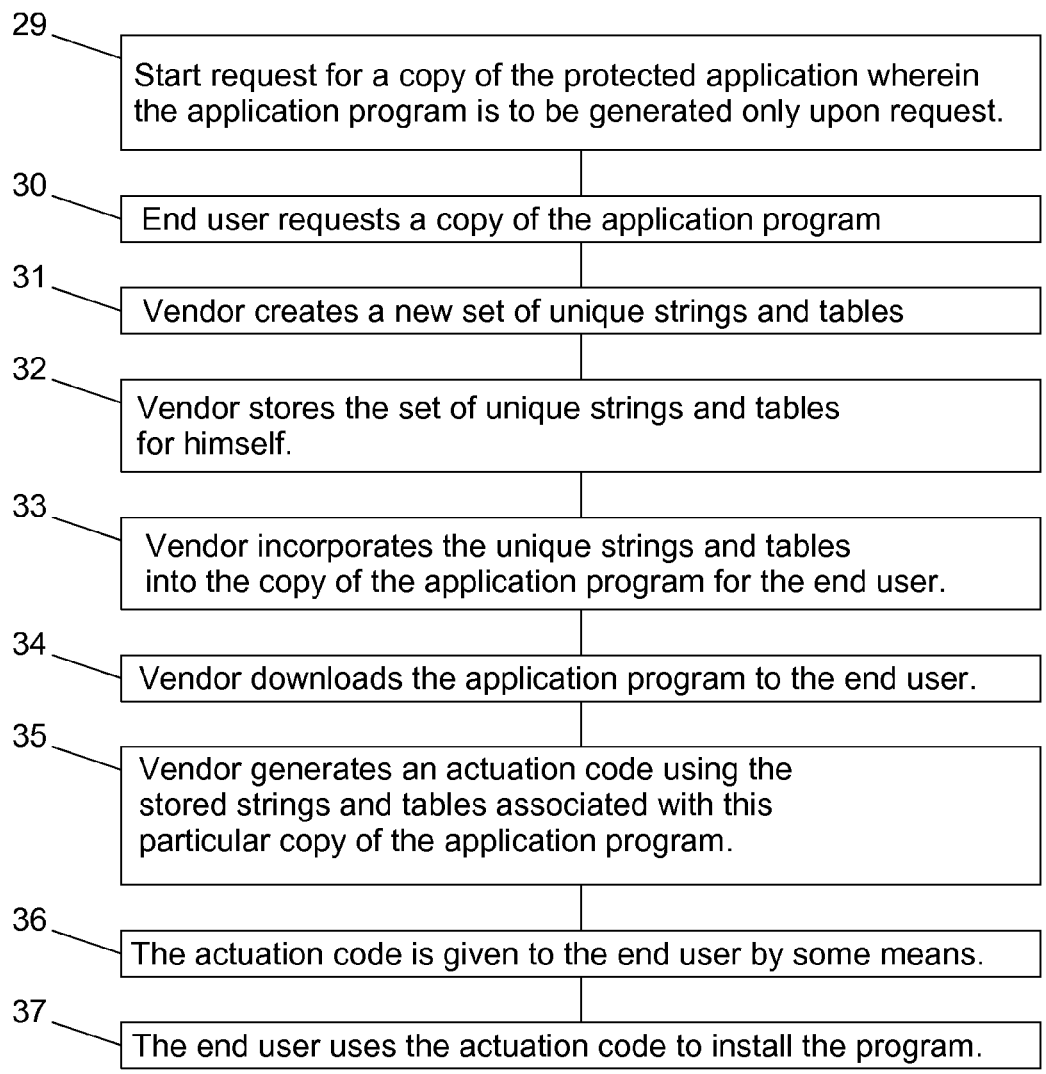
FIG. 4 depicts a scenario wherein an a protected program might be generated upon request by an end user.

FIG. 3 depicts a situation wherein an end user would request a copy of a protected application program from a vendor, for example over a telephone or the internet, wherein there are copies of the protected application program already available for use, starting with 21.

The end user makes his request 22 so the vendor fetches a copy 23 and downloads it 24 to the end user. The vendor then fetches the unique strings and tables 25 associated with the just downloaded program and generates an actuation code using them 26. The vendor then gives the user the actuation code. The actuation code is given to the user 27 by voice mail, email, text messaging, user log in and retrieve, telephone, or by some other means. The user would 28 then use the actuation code to install the protected program.

FIG. 4 depicts yet another way in which the invention could be utilized by the vendor, starting at 29. Namely, by waiting for an end user request 30 before creating a protected program. In this case, the vendor would create a new set of unique strings and tables 31 and then store a copy of them 32. The vendor would then get the requested application program and have the unique strings and tables automatically incorporated into the application program in order to derive a protected application program 33. The vendor would then download 34 the protected program to the user. Now the vendor would use the newly created unique strings and tables to generate an actuation code 35, and then give or send them to the end user 36 by some means so that the end user could use it 37 to install the downloaded code.

Similar scenarios could be derived using mailed media such as CDROM, DVD, Flash, tape or other media to get the protected program and actuation code to an end user. The principles would be the same.

Figure 5:
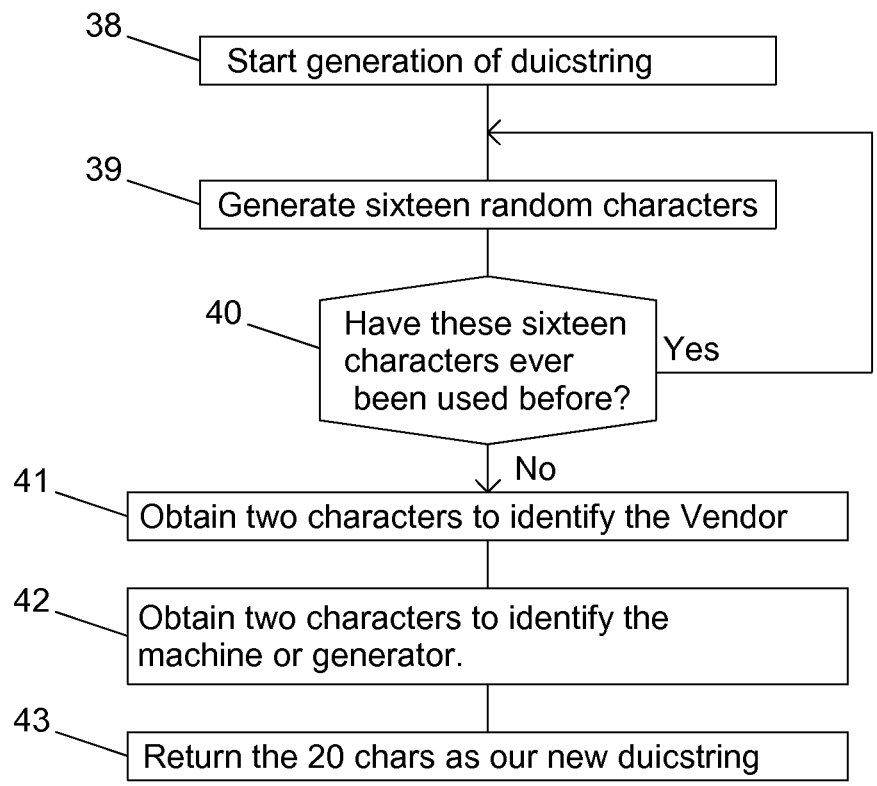
FIG. 5 is an overview of the creation of a dummy unique internal character string, to be described later.

The generation of the duicstring is depicted in FIG. 5, starting with 38. A set of sixteen random characters are obtained in 39. However, the particular vendor may have used that string of sixteen before, so the vendor must check for that, as in 40. If it has been used before a new set is generated, etcetera, until a set is found that has never been used. The chances of repeating a set are so low that it should never happen, but theoretically it is possible, and so it is checked for.

Random character generation 39 algorithms can be found in many computer science textbooks. The random character generator is used in standard ways and hence will not be further described.

After a unique set of sixteen random characters are found, the current embodiment of the invention appends two more characters to identify the particular vendor 41, in case there is more than one that creates the protected application program. In addition, a vendor may have more than one computer generating protected programs, and so two additional characters 42 are appended in the current embodiment to allow the vendor to identify more than one machine, which, when all the characters are put together, form the desired twenty character duicstring 43.

The duicstring is known to an end user and to the manufacturer. If an end user needed a new actuation code for his particular copy of an application program he would contact the manufacturer with the duicstring. The duicstring and perhaps other user personal information would be used by the manufacturer to obtain the kuicstring and tables of information needed to generate a new actuation code. The kuicstring is, of course, embedded within the said copy of the user's Application Program, as well as being known by the manufacturer.

Figure 6:
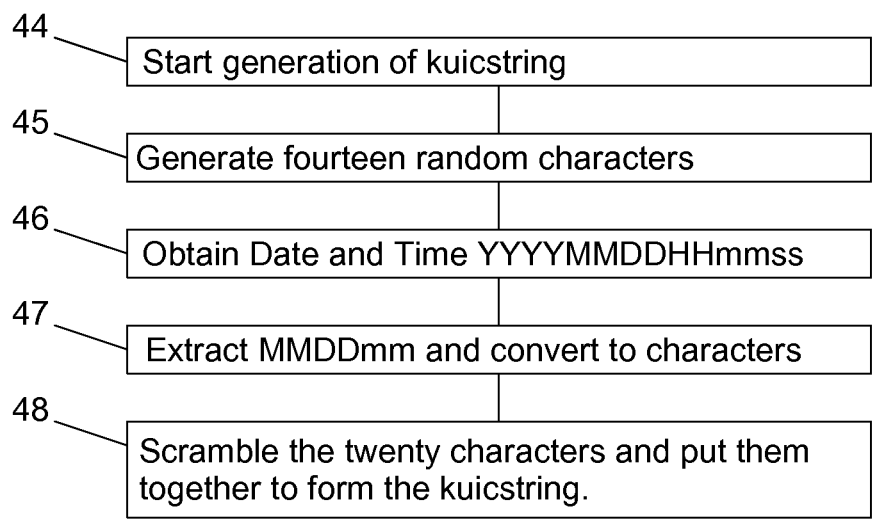
FIG. 6 is an overview of the creation of a knowledge laden unique internal character string—kuicstring for short.

The generation of the kuicstring is depicted in FIG. 6, starting with 44. To generate the kuicstring, start with fourteen random characters 45. Checking to see if the fourteen characters have been used before is not necessary. Even if a duplication happened there would be no harm because no one could know which two protected programs had an internal duplication.

In the current embodiment of the invention, the kuicstring also has embedded into it something that could be converted to numbers. Letters, numbers or other characters could have been used for the numeric purpose. The current embodiment uses the base sixteen number system in some areas, which uses letters as well as numerals as numbers, and base ten numerals in other areas, just to make things more difficult for a pirate to decipher. All numeric information is first disguised as other characters.

Numbers from the timestamp of the day of program creation are used in the creation of the kuicstring. The MM, DD and mm numbers are used from a timestamp of the form YYYYMMDDHHmmss where YYYY are the year digits, MM are the month digits, DD are the day digits, HH are the hour digits, mm are the minutes digits and ss are the seconds digits. For example 20061122192433 would be 19 hours, 24 minutes and 33 seconds after the start of Nov. 22, 2006. Hour 19 of the day is 7 pm.

The reason month, day and minute information was chosen is because MM, DD and mm digits can be checked for being within their allowed limits, giving us yet another way to check for validation. The most important thing is that no matter what kind of information is put into a kuicstring, or how arbitrary it may be, the entire system must know what the kuicstring is made up of, whatever it is.

Continuing with FIG. 6, item 46 is where the YYYYM-MDDHHmmss is obtained, and 47 is where the MM, DD and mm are extracted and converted into characters, capital letters in the current embodiment. Once the said conversion is done, the twenty characters are put together to form the kuicstring 48.

Figure 7:
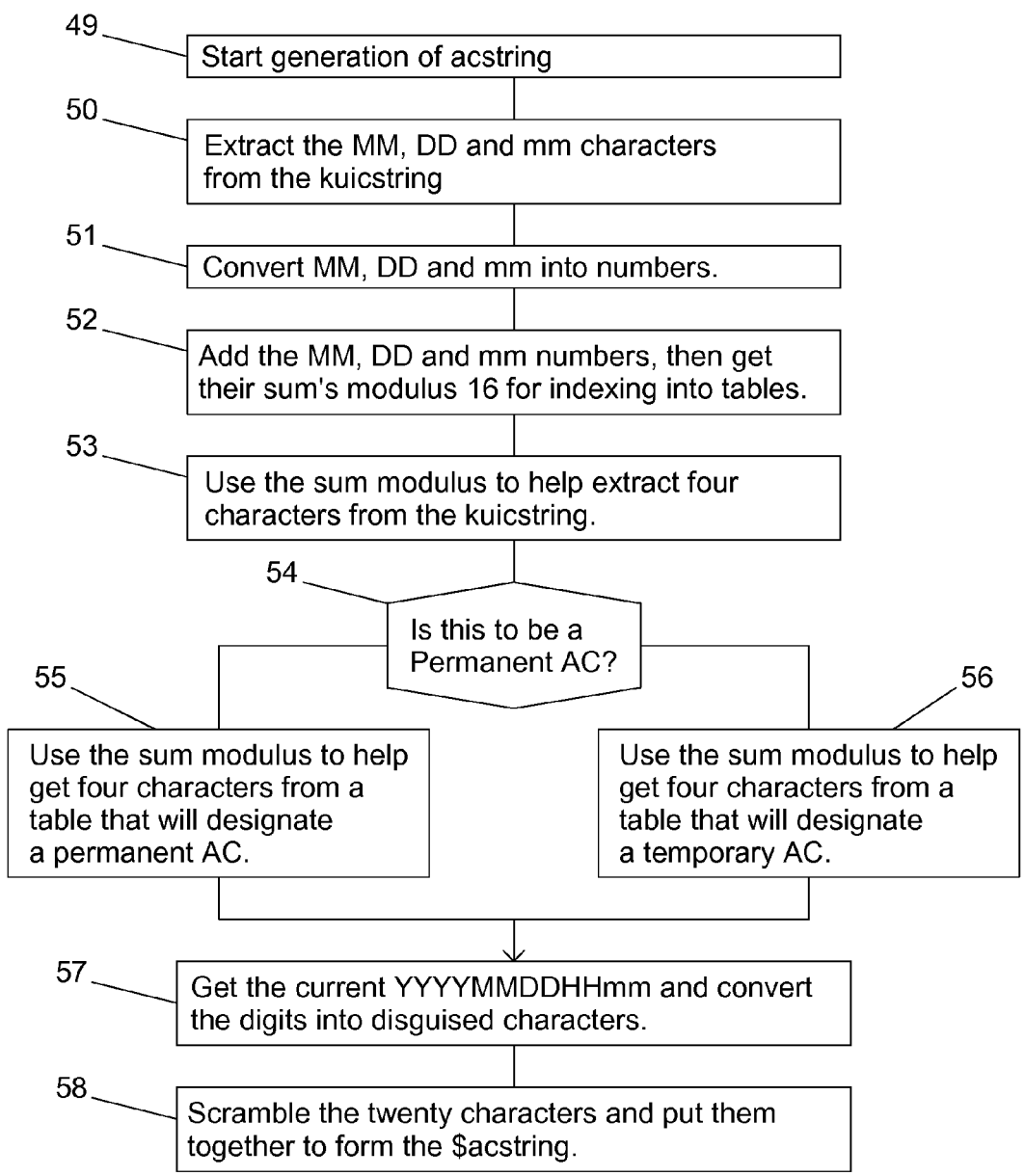
FIG. 7 is an overview of the creation of an actuation code.

The generation of an Actuation Code will now be outlined, starting with FIG. 7, item 49. In the current embodiment of the invention, the numeric based characters of the kuicstring of the particular protected application program in question are obtained 50. The said kuicstring characters are then converted back into their numeric values 51. The numerals for MM, DD and mm are added together and the sums modulus base sixteen is determined 52. There are tables whose depth is sixteen that need accessed, and hence the need for a number, the sum's modulus, to use as an index that can have sixteen possible values. One of the depth-sixteen tables is a table that helps us extract four characters of the kuicstring that are also to be found in the Actuation Code. This extraction is done at 53. Likewise, the said modulus value is used to extract four characters from a table that will identify a permanent AC 55 or a temporary AC 56, as determined to be needed at 54.

Along with the eight characters obtained so far for the AC are added twelve more. Namely, the YYYYMMDDHHmm numbers of the day and time of creation of the actuation code, after first disguising them as letters 57. The twenty numbers are then put together to form the final actuation code 58.

Figure 9:
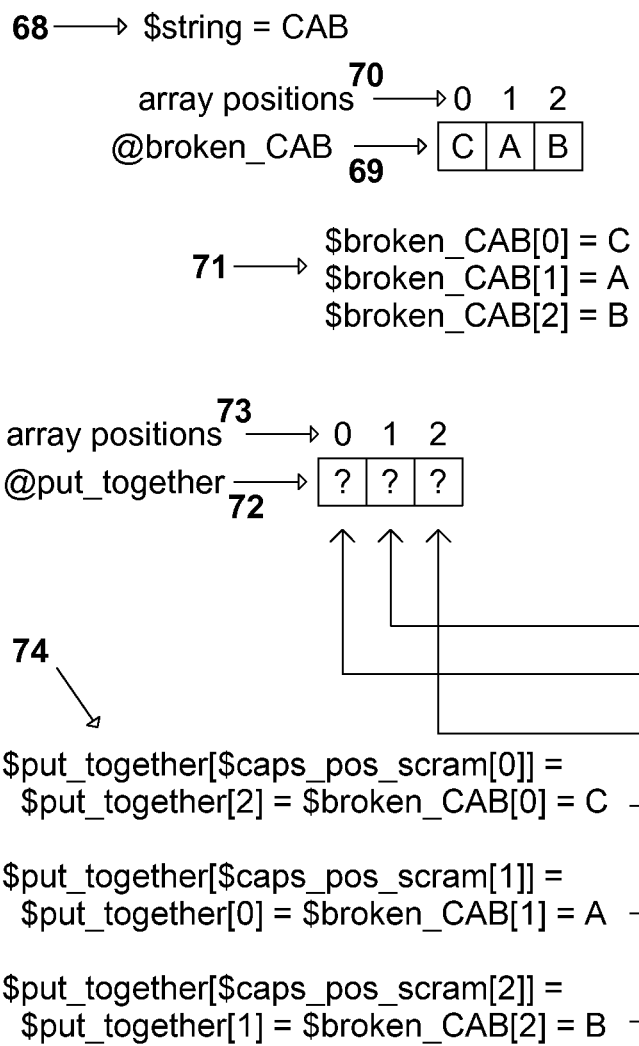
FIG. 9 is an outline of going from a string to an array.

Much of this invention is about arrays, strings and characters. Here will be a short discussion of what the current embodiment of this invention means by array notation, arrays, accessing arrays, the idea of a scrambled array, and how the elements of a scrambled or unscrambled array can be used to access another array which itself may or may not be scrambled. FIG. 8 and FIG. 9 will be used in this process.

Let an ampersand @ denote a grouping of more than one thing, called an array. Let a dollar sign $ denote a single thing such as a string, letter, number or other character.

Consider an array of three capital letters, call it @caps, as with FIG. 8 item 59. Let the array have the three values [A B C] as depicted in 59. The use of brackets, @ and $, as used herein, are the standard notation for the program language used in the current embodiment of the invention. Counting is from zero in array notation, not from one, so the array positions 60 of @caps are denoted 0, 1, and 2. Array positions here are always counted from left to right, with zero denoting the first element, 1 the second element, etcetera. This method of denoting the positions of elements in an array is used for all arrays described and shown in the figures, such as items 60, 63, 66, 70, 73, 77, 79, 81, 83, 85, 88, 90, 92, 94, 96, 98, and 102.

As 61 is meant to imply, the three values of @caps 59 can be accessed using the notation $caps[0], $caps[1] and $caps [2]. Therefore $caps[0] is the letter A, $caps[1] is the letter B, and $caps[2] is the letter C.

Now consider another array with three elements. In this array, call it @caps_pos_normal 62, let the contents of each element be the same as its normal position number. That is, [0 1 2]. In like manner to @caps 59, @caps_pos_normal 62 is accessed using the notation $caps_pos_normal[0] for the number 0, $caps_pos_normal[1] for the number 1, and $caps_pos_normal[2] to get the number 2.

Access to the letter A of @caps 59 would be done by denoting $caps[0] since the letter A is the value of the zeroeth element, as shown in 61. The elements of the @caps_pos_ normal 62 array will be utilized to access @caps 59 because the technique it utilizes is part of the invention, and hence will be used throughout the invention. Understanding the technique is needed to understand the invention. This is what is depicted as 62, 63 and 64.

Looking at 64, since $caps_pos_normal[0] evaluates to the number 0, substituting the number 0 in $caps[$caps_pos_normal[0]] gives us $caps [0], which is an A. The letters B and C are found in the same manner in 64.

The way the elements of one array are used to access the elements of another array has just been described.

Now, attention is directed to the idea of scrambling. A third array with three elements will be used, call it @caps_pos_scram, as depicted as 65 in FIG. 8. In @caps_pos_scram 65, the scrambled numbers [2 0 1] are used. As 67 shows, $caps_pos_scram[0]=2, $caps_pos_scram[1]=0, $caps_pos_scram[2]=1, and so $caps[$caps_pos_scram[0]]=$caps[2]=C, $caps[$caps_pos_scram[1]]=$caps[0]=A and $caps[$caps_pos_scram[2]]=$caps[1]=B You now know the way the elements of a scrambled array are used to access the elements of another array. Namely, exactly the same way as with a normal array, only what you get in the end is different because the elements of the interposing array have its numbers scrambled. Understanding the concept of using scrambled values of an array of numbers as position numbers for which to access elements of another array is needed to understand this invention. Just to be clear, the example of using the elements of @caps_pos_scram 65 to scramble @caps 59, [A B C], into [C A B], is what was just shown.

An example will now be given in doing the reverse. That is, using the same interposed scrambled array of numbers, @caps_pos_scram 65, only this time to unscramble. FIG. 8 and FIG. 9 both will be used in the description.

Assume that the three letters [C A B] have been concatenated together to form the string called $string 68. The value of $string is hence CAB.

In the process of unscrambling, it is necessary to break up the $string 68 into individual characters and put the characters into the elements of an intermediate array. FIG. 9 is a pictorial of starting with the string $string 68, with a value of CAB, and breaking up CAB into C, A and B, and putting them into an array called @broken_CAB 69. The same scrambled array as before will be used, @caps_pos_scram 65, to access the elements of @broken_CAB 69, and put those three accessed values into a new array called @put_together 72. As before, the array positions 70 and 73 are identical to the other three element array positions 60, 63 and 66 already mentioned.

Breaking up $string 68 and putting it's characters into @broken_CAB 69 should be obvious from the pictorial items 68, 69, 70 and 71. What is not so obvious is using the three elements of @caps_pos_scram 65 to unscramble @broken_CAB 69 into @put_together 72.

In each step, to unscramble, associate position of the target array @put_together 72 with the position number found in the corresponding element of the same interposing array that was used for scrambling. Namely, @caps_pos_scram 65.

In this case, we would be making these associations:
  i. $put_together[$caps_pos_scram[0]]=$broken_CAB [0]
  ii. $put_together[$caps_pos_scram[1]]=$broken_CAB [1]
  iii. $put_together[$caps_pos_scram[2]]=$broken_CAB [2]

For example, the item that goes into $put_together[$caps_pos_scram[0]] would be whatever is in $broken_CAB[0], which is the letter C. The value of $caps_pos_scram[0] is the number 2, so looking for what goes into $put_together[$caps_pos_scram[0]] evaluates to looking for what goes into $put_together[2], so we would put the stated letter C into $put_together[2].

Similarly,
  i. $put_together[$caps_pos_scram[1]]=$put_together[0]= $broken_CAB[1]=A
  ii. $put_together[$caps_pos_scram[2]]=$put_together [1]=$broken_CAB[2]=B Thus @put_together 72 will get the values [A B C], as with the original @caps 59.

The key idea of this part of the discussion is the back and forth conversion between strings, arrays, and the use of an interposing scrambling array.

There is one more concept to bring forth, and that is the disguising of characters, such as numbers, as other characters, which could in themselves be any character including numbers themselves. Capital letters for disguising numbers will be used to make descriptions easier. There are no depictions of this since it is fairly straightforward.

Consider the array @three_chars [W B R] and the @three_norm_nums [0 1 2]. If it is desired to use direct conversion, the notations could be like that shown below.
  i. $three_chars[0] is equivalent to $three_norm_nums[0]
  ii. $three_chars[1] is equivalent to $three_norm_nums[1]
  iii. $three_chars[2] is equivalent to $three_norm_nums[2]

In other words, W=0, B=1 and R=2. However, in the actual invention, an interposing array of scrambled numbers is used in the same manner as demonstrated before. Accordingly, that will be demonstrated here, and use the equal sign to shorten the verbiage. Consider the scrambled array of numbers @three_scram_nums=[2 0 1].
  i. $three_chars[0]=$three_scram_nums[0]=2
  ii. $three_chars[1]=$three_scram_nums[1]=0
  iii. $three_chars[2]=$three_scram_nums[2]=1

So in this case W=2, B=0 and R=1.

The process of going from number to letter is called letterfy in this invention. The process of going from letter to number is called numberfy. Both letterfy and numberfy will be used in this invention.

Attention is directed now to actual character, string and array items associated with the creation, scrambling and unscrambling of uicstrings and actuation codes. The method of notation and of arrays, strings, and accessing such, that were just developed, will now be employed.

Figure 10:
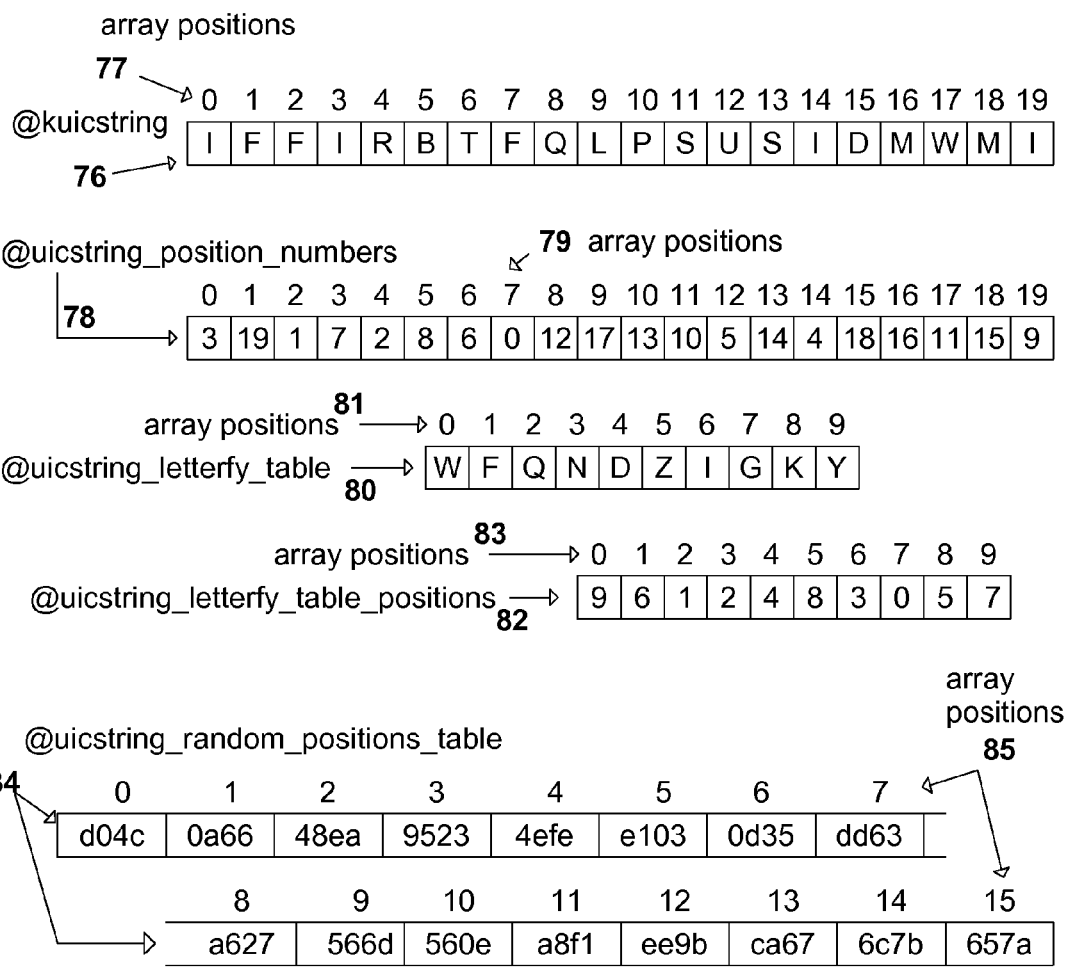
FIG. 10 has tables and character strings most associated with a kuicstring.
Figure 11:
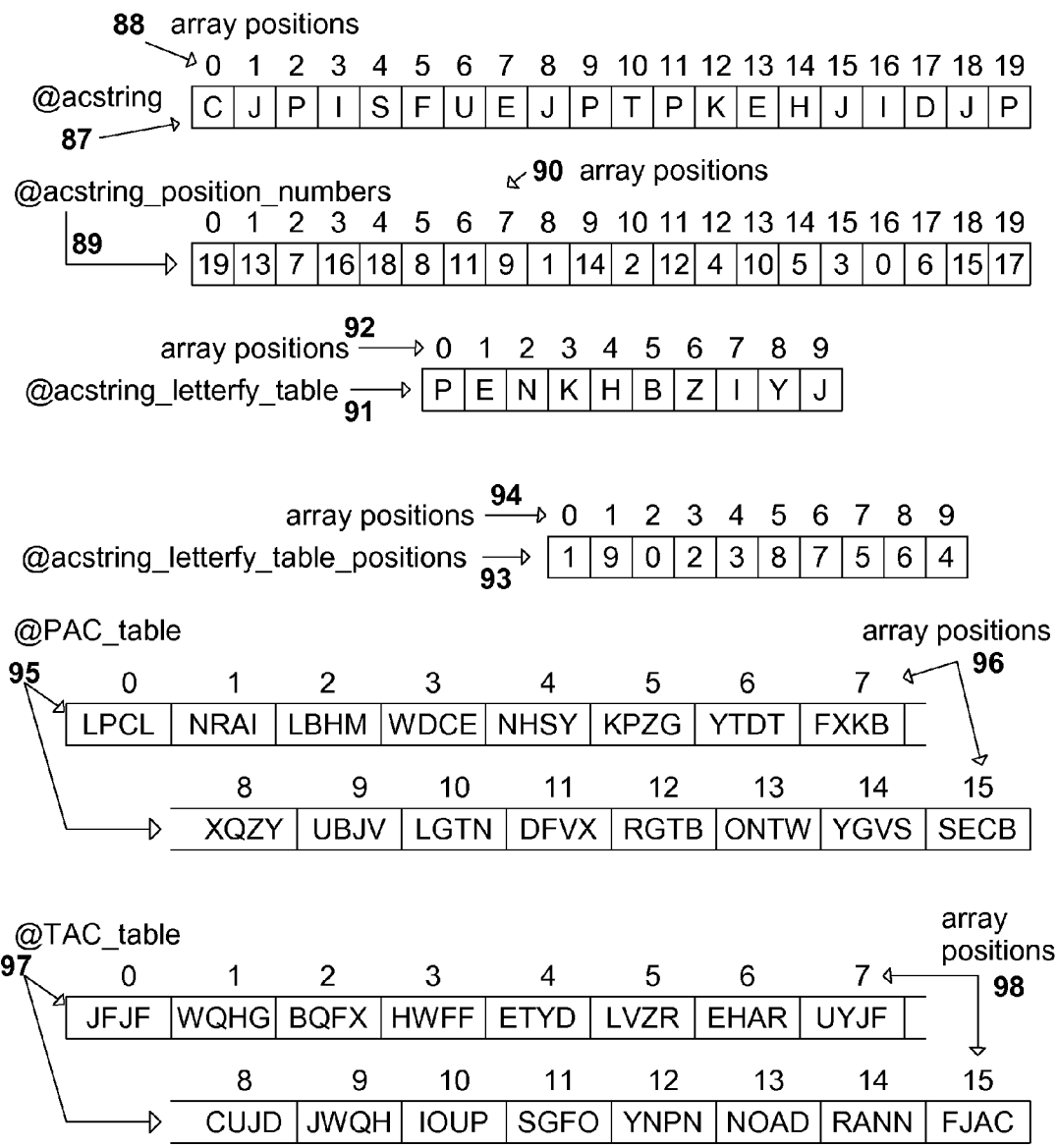
FIG. 11 has tables and character strings most associated with an actuation code.

Here is a listing of the major numbers, arrays and strings in the provided current embodiment of the invention. FIG. 10 and FIG. 11 show the actual numbers and letters taken from the provided computer listing files, using the actual names taken from the provided computer listing files. The two figures show all but the first two in the list, $ac_max_days_perm and $ac_max_days_temp. Keep in mind that the numbers and letters in strings and arrays change from protected copy to protected copy.

$ac_max_days_perm. The number of days an end user has in which to install his program using a given permanent actuation code. The current embodiment uses the value 1.

$ac_max_days_temp. The maximum number of days an end user has in which to use his program once it is installed. The current embodiment uses the value 30.

$kuicstring 75. The twenty character string $kuicstring 75 is shown in FIG. 10, and is as formerly described. The designations of the characters that make up the $kuicstring 75, C1 through C14, M1, M2, D1 and D2 will be used in explanations.

@kuicstring 76. This twenty character array holds a $kuicstring 75 after it has been broken up into its individual characters. In reverse, that is, in the formation of a $kuicstring, it may also obtain characters one by one as they get created, to eventually be put together to form a $kuicstring.

@uicstring_position_numbers 78. Randomly ordered array of the numbers 0 through 19. The kuicstring is twenty characters in length, so the position numbers of the characters that make up a @kuicstring are numbered 0 through 19. In other words, the numbers in the @uicstring_position_numbers are scrambled.

@uicstring_letterfy_table 80. Table of ten random characters used for disguising numbers associated with a uicstring as a letter, one for each numeral of the base ten number system.

@uicstring_letterfy_table_positions 82. Randomly ordered array of the numbers 0 through 9. These are the ten numerals of the base ten number system. It is used as an interposing scrambled array of numbers when letterfying a uicstring number.

@uicstring_random_positions_table 84. A table of depth sixteen. Each depth holds a string that is made up of four randomly chosen hex characters. As part of the antipiracy scheme, four characters of the @kuicstring are to be chosen to be required to be part of any actuation code. The same four could also be chosen to be in a stored configuration file. Each of the characters from any said four hex characters string are used to determine the elements of a @kuicstring that will be extracted for use in an actuation code or configuration file. This is depicted in FIG. 12, item 99.

$acstring 86. The twenty character string $acstring 86 is shown in FIG. 11, and is as formerly described. It contains twelve time and date characters of the form YYYYMMDDHHmm, after disguising them as characters and scrambling them. It also contains four characters that come from the $kuicstring and four characters that represent a permanent or a temporary actuation code.

@acstring 87. This twenty character array holds an actuation code $acstring 86 after it has been broken up into its individual characters. In reverse, that is, in the formation of an $acstring, the @acstring may also obtain characters one by one as they get created, to eventually be put together to form an $acstring.

@acstring_position_numbers 89. Randomly ordered array of the numbers 0 through 19. The $acstring is twenty characters in length, so the position numbers of the characters that make up a @acstring are numbered 0 through 19. In other words, the numbers in the @acstring_position_numbers are scrambled.

@acstring_letterfy_table 91. Table of ten random characters used for disguising numbers associated with an acstring as a letter, one for each numeral of the base ten number system.

@acstring_letterfy_table_positions 93. Randomly ordered array of the numbers 0 through 9. These are the ten numerals of the base ten number system. It is used as an interposing scrambled array of numbers when letterfying an acstring number.

@PAC_table 95 and @TAC_table 97. Tables of depth sixteen. Each depth holds four random characters. Each of the four characters must be found in certain positions within an actuation code in order for the actuation code to be identified as a permanent or temporary actuation code.

As with all arrays the array positions 77, 79, 81, 83, 85, 88, 90, 92, 94, 96 and 98 are numbered left to right starting with zero.

An outline of the major pieces that make up the invention have been outlined, and sufficient information has been presented to now allow a more detailed explanation of FIG. 6 and FIG. 7.

Starting with FIG. 6, just after the generation of the fourteen random characters 45, the date and time information is obtained in the form YYYYMMDDHHmmss. The computer language used has built in commands to find the epoch seconds, that is, the number of seconds since Jan. 1, 1970, the official beginning of agreed upon Unix type computer time keeping. There is also a built in command to convert the epoch seconds to seconds, minutes, hour, etcetera, which are then put together in YYYYMMDDHHmmss form for further use.

In FIG. 6 item 47, MMDDmm is extracted from YYYYMMDDHHmmss. The numbers 11, 22 and 23 will be used for the MM, DD, and mm, respectively, of item 47, for example purposes. The MM, DD, and mm that will help form a $kuicstring are not related to the MM, DD and mm that are part of an $acstring. The $kuicstring and $acstring each have their own. The numbers shown in the examples are nearly the same because the strings, numbers and letters are all taken from an embodiment in which the $acstring was created only a minute after the $kuicstring.

FIG. 13 item 100 will be used to show the lower level details of FIG. 6 item 47, and convert the numeric values into characters.

In 100, the MM, DD, mm numbers are broken up into their individual values. The formula for the disguising letter is shown, and is i. $uicstring_letterfy_table[$uicstring_letterfy_table_positions[$number]]

$number will be, in turn, the six digits from MM, DD and mm. The conversion for all six digits is shown in item 100. Just to be clear the first digit, the first month number, the numeral 1, will be explained.

As can be seen from FIG. 10 item 82, $uicstring_letterfy_table_positions[1] is the number 6. Replace $uicstring_letterfy_table_positions[1] with the number 6 in the formula below.

i. $uicstring_letterfy_table[$uicstring_letterfy_table_positions[1]]

This leaves us with $uicstring_letterfy_table[6]. As can be seen from FIG. 10 item 80, $uicstring_letterfy_table[6] is the letter I.

FIG. 13 item 100 shows in the same manner that the final six letters are [I I F F F Q]

The six converted characters are denoted as shown below:
i. $CM1 is I
ii. $CM2 is I
iii. $CD1 is F
iv. $CD2 is F
v. $Cm1 is F
vi. $Cm2 is Q This concludes the FIG. 6 item 47 conversion of MMDDmm into characters.

Figure 14:
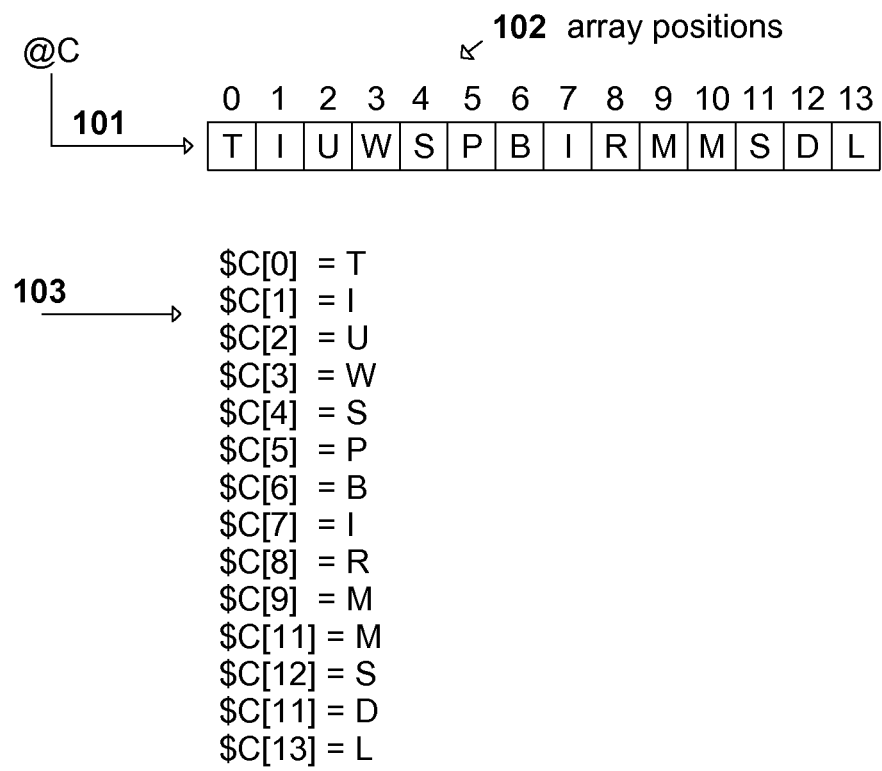
FIG. 14 shows a random character array of size 14.
Figure 21:
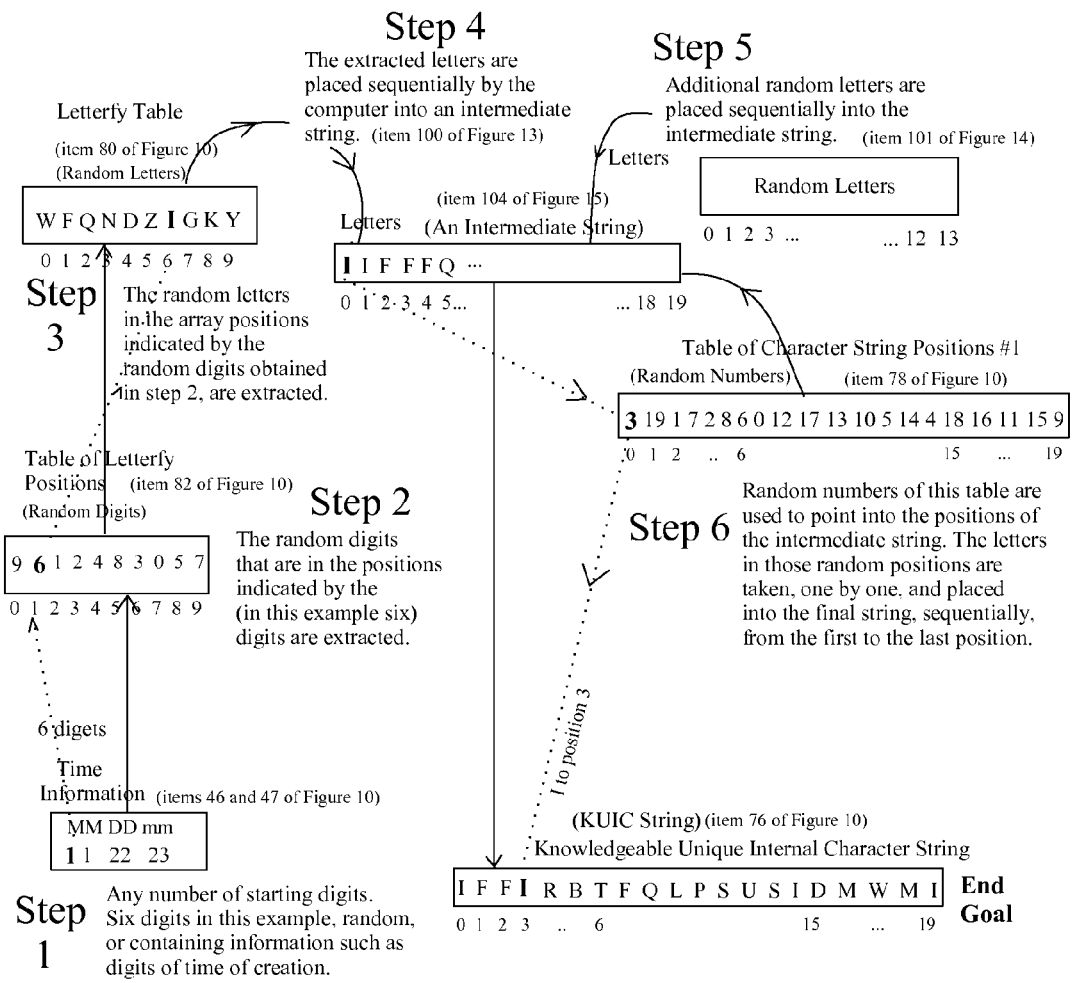
FIG. 21 a flow chart showing the generation of a kuicstring from a seed string, wherein the intermediate string is padded with random characters.
Figure 23:
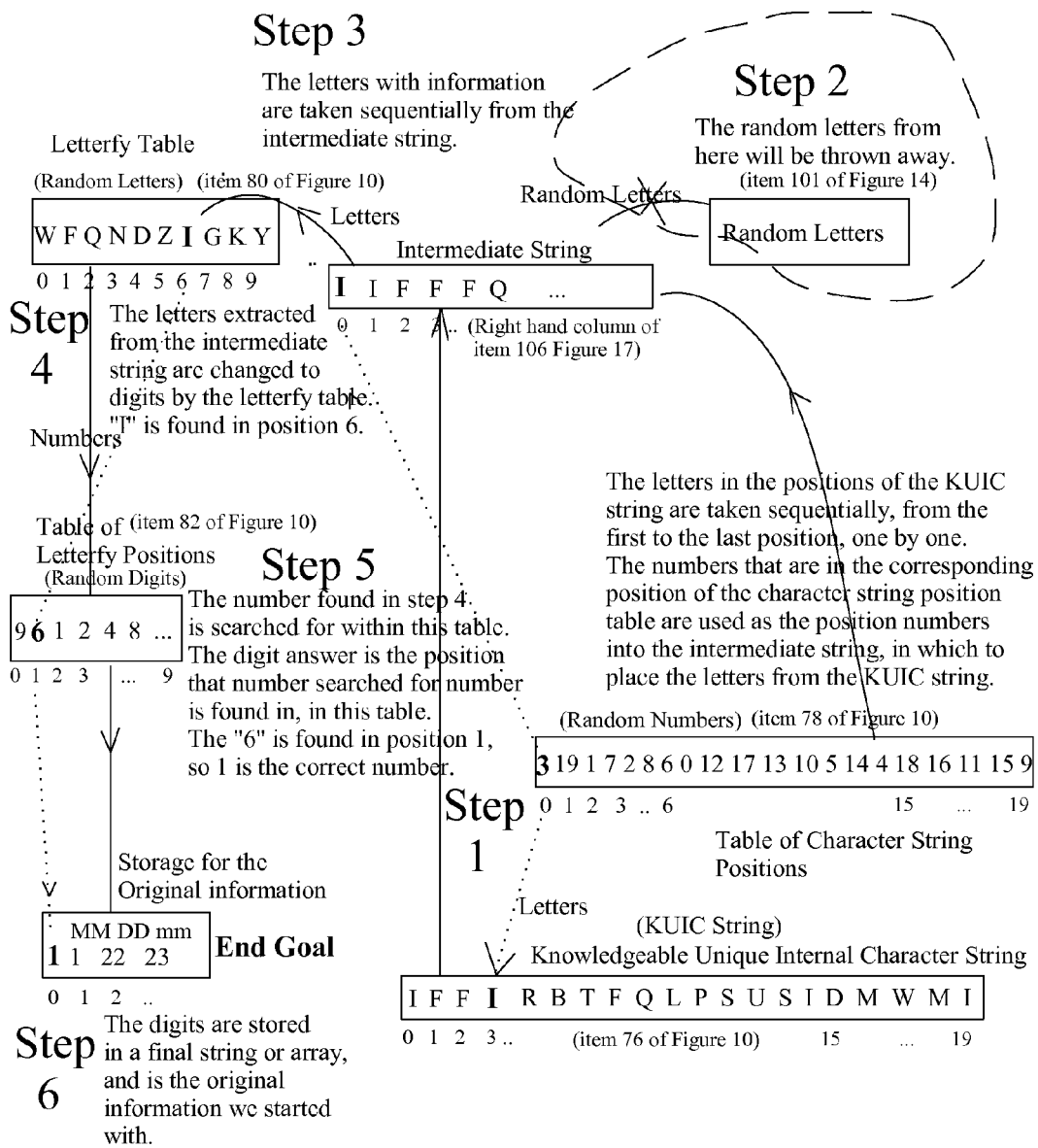
FIG. 23 is a flow chart showing the extraction of the original seed string from a kuicstring.
Figure 24A:
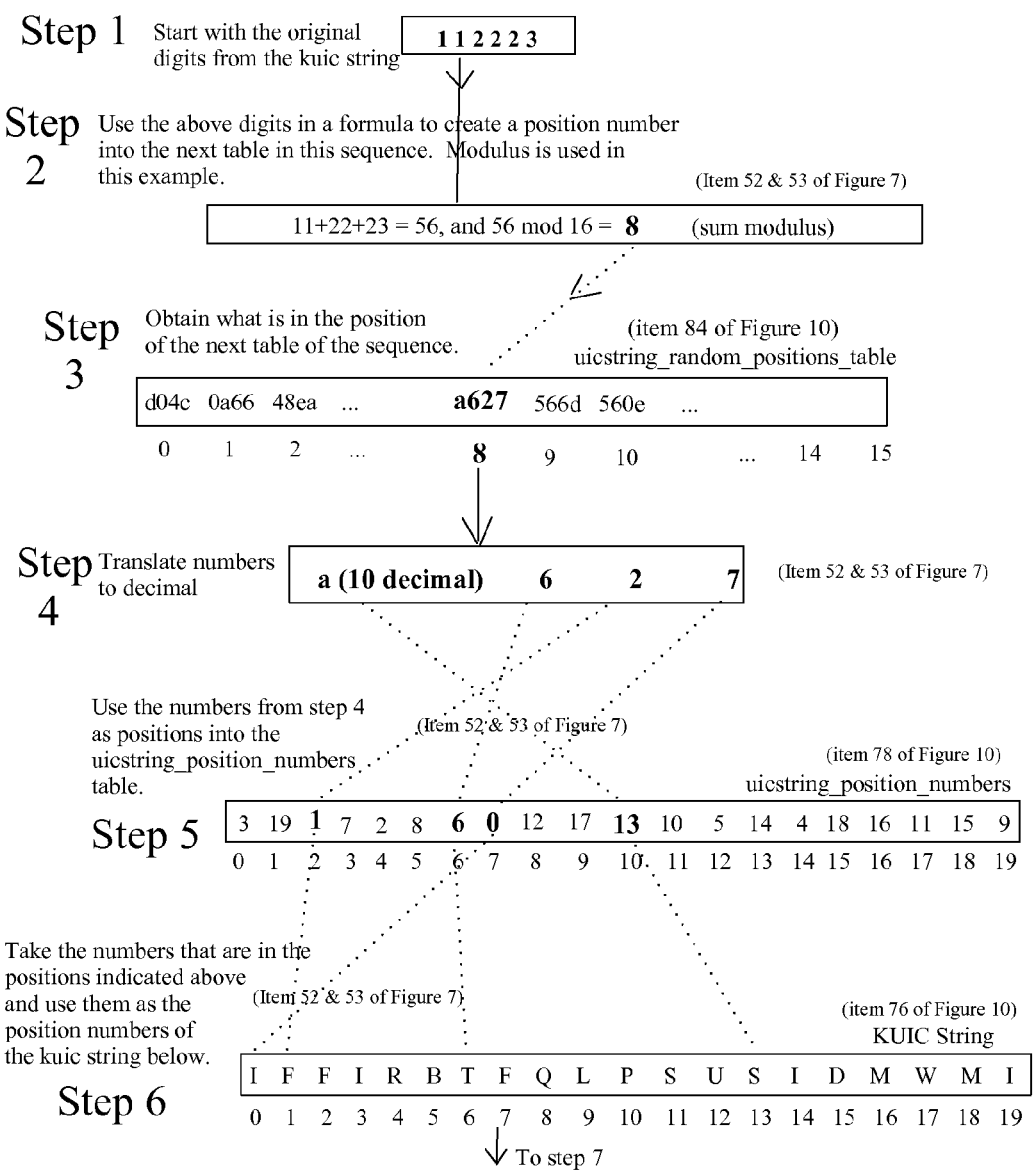

Further details of forming the kuicstring from the twenty characters, FIG. 6 item 48, will now be shown with the help of an array of random characters, @C, as shown in FIG. 14 item 101. As with other arrays the elements of @C are denoted per their array positions 102, namely, $C[0], $C[1], etcetera, as shown as item 103. Item 103 shows all fourteen elements denoted individually.

FIG. 15 item 104 shows the putting together of the final @kuicstring array with twenty characters. Just to be clear, the minute details of taking the first three characters of FIG. 15 item 104 are shown in FIG. 16 item 105. For example as FIG. 16, 105 shows, $uicstring_position_numbers[0] evaluates to the number 3. Substituting the numeral 3 in $kuicstring[$uicstring_position_numbers[0]], leaves $kuicstring[3]. Thus, $kuicstring[3], gets the value of whatever $CM1 is, which in this case is the letter I.

In the derivation of an actuation code, MM, DD and mm characters need extracted from the kuicstring as depicted in FIG. 7 item 50. This is detailed in FIG. 17 item 106. It is the reverse of what was done in putting the kuicstring together, as depicted in FIG. 15 item 104. In 106 the targets of the deconstruction are shown on the left. That is, $CM1, $CM2, etcetera. The same interposing @uicstring_position_numbers 78 is used. Just to be clear, in the first line of 106, $uicstring_position_numbers[0] evaluates to the number 3, and $kuicstring [3] evaluates to the letter I, and hence the final value of $CM1 is the letter I. Similarly, all of the targets on the left side of 106 get the final values shown on the right side of 106.

In FIG. 13 item 100, the numbers [1 1 2 2 2 3] were converted to the letters [I I F F F Q] as previously described. The characters came from the kuicstring, so the @uicstring_letterfy_table 81 and the interposing @uicstring_letterfy_table_positions 82 arrays that were used to disguise the numbers as letters, would be used in reverse to go from letter to number.

FIG. 7 item 52 depicts taking MM+DD+mm, to get a single number. The modulus of that number is then found, base 16. In the current embodiment this evaluates to summing 11+22+23=56, and 56 modulus 16 evaluates to the numeral 8.

FIG. 7 item 53 indicates that the sum modulus is used to help extract four characters from the kuicstring. This is shown in more detail in FIG. 12, item 99.

Since the said sum's modulus is the number 8, $uicstring_random_positions_table[8] is obtained, which, from FIG. 10 item 84, is the string a627. In the current embodiment of the invention, the four numbers a, 6, 2 and 7 are used to extract from the @uicstring_position_numbers, as shown in FIG. 12 item 99. The four numbers extracted using the hex numbers a, 6, 2 and 7 are the decimal numbers 13, 6, 1 and 0. Finally, the numbers 13, 6, 1 and 0 are used to extract the four characters from the kuicstring, again as depicted in FIG. 12 item 99.

FIG. 7 item 54 shows a choice of whether to make a permanent actuation code, PAC, or a temporary actuation code, TAC. The choice determines whether the PAC_table or TAC_table is used, which are FIG. 11 Items 95 and 97, respectively. For purposes of explanation a TAC will be created, and therefore the @TAC_table 97 will be used.

In the current embodiment the sum modulus is the numeral 8, and is used in the same manner as before. Namely, as an index into a table, in this case the @TAC_table 97, to extract CUJD. In the current embodiment an interposing array of numbers was not used. In the current embodiment, in addition to the four random kuicstring characters S, T, F, and I, the four characters C, U, J and D must be present in the acstring in order to be determined to be a valid TAC.

If a PAC were to be created, the @PAC_table 95 would have been chosen, and XQZY would have been chosen from @PAC_table 95 instead of CUJD from @TAC_table 97.

In FIG. 7 item 57 the date and time information is obtained in the form YYYYMMDDHHmmss as previously defined, and would be the date and time that the actuation code was created. To convert the numbers into letters 57, the current embodiment does it the same way it did with the kuicstring numbers, only it uses the @acstringletterfy_table 91 and the @acstring_letterfy_table_positions 93 arrays instead of the @uicstring_letterfy_table 80 and the @uicstring_letterfy_table_positions 82.

FIG. 7 item 58 mentions putting the twenty characters obtained into an $acstring. Consider the YYYYMMDDHHmmss as defined previously. All but the two seconds digits, ss, are embedded into the acstring, after the conversion to letters as in FIG. 18 item 107. Along with the twelve letterfied time and date characters, embed the four PAC or TAC characters, and the four letters from the kuicstring, all as previously mentioned. The same method is used as with putting together a $kuicstring. The interposing array of numbers used is the @acstring_position_numbers 89 instead of the @uicstring_position_numbers 78. FIG. 19 item 108 depicts putting the @acstring together with the interposing @ acstring_position_numbers.

The descriptions of how the $duicstring, $kuicstring, and $acstring are formulated are now complete.

Attention is directed now to how long an end user is permitted to install his application program, and enforcing that length of time.

In the current embodiment of the invention, a temporary actuation code is valid for up to thirty days. This means that the user has thirty days in which to install a protected program. It also means that there are only up to thirty days to run the program, and the total amount of time that is allowed to pass, installation plus running time, cannot exceed thirty days.

For a permanent AC, the time in days would normally be a single day. That is, the end user must install the protected application program on the day the permanent AC is received. After installation, the protected program would always work.

To enforce the allotted time for a permanent AC, all that is needed is the allotted time to be available to the program code that checks for it, and a routine to compare the current date with the date embedded within the actuation code, and check for compliance with the allotted time. In the current embodiment it is implemented by having a routine to retrieve an encoded maximum number of days allowed, and a different routine to compare the current date with the date embedded within the actuation code. The subroutine in the current embodiment is very similar to that shown below, which will return the maximum days allowed.

```
sub get_ac_max_days_perm_1
    i. {
    ii. # The user will have this many days in which to install the
    iii. # application software.
    iv.   my $max_days = 1;
    v.    return($max_days);
    vi. }
```

Standing alone, a software pirate can find where this is placed in the code, and change the number 1 to a huge number, effectively ruining the antipiracy scheme. A software pirate can also simply change the comparison statement in the program code to evaluate to indicate a correct match whether the numbers match or not.

This invention thwarts such an effort by allowing many such subroutines to be placed throughout the program code. For example by having clones of the said subroutine and giving them names such as get_ac_max_days_perm_1 through get_ac_max_days_perm_9. In addition, the different said subroutines would be invoked separately, in turn, by different portions of the protected application code. This will avoid having the code that checks the allotted time from being in just one place.

No matter what scheme is used for getting and comparing the days that an AC remains valid, the important thing is to not have the final numbers used for comparison in just one place in the program code. In addition, invocations to the said subroutines should also not be in just one place in the program code.

Attention is directed now to how this invention allows an end user to use a single copy of a protected application program on more than one computer, such as in a family that has more than one computer.

In the current embodiment of the invention, the end user has only one day in which to install a protected program using a permanent AC. In that one day, the end user can install it on as many computers as desired. Beyond that day, to get another permanent AC the end user would have to be a registered end user. Part of the process of obtaining a new permanent AC is to contact the manufacturer with the duicstring for the said program and perhaps personal and financial information. If desired, the vendor can put a time limit such as five years, and/or a maximum number of times for issuing a new permanent AC, such as five times.

Admittedly, this also leaves room for a dishonest end user to quickly pass the AC to friends and associates. Consider a scenario in which ten students in a dormitory illegally used the same AC, on the same day of course, to install the same copy of a protected application program. Eventually all computers will break, or have the operating system upgraded, or need reinstalled, or the end user will simply want to get a newer computer. At that time, if the end user is used to using the protected program he will want to continue using it. The old AC will no longer be valid so unless the user is the original registered user, and the number of new actuation codes has not been exceeded, and the time limit for obtaining a new actuation code has not expired, a new copy of the protected program will have to be purchased. In the long run, if this invention is used, such software piracy may even add to sales.

There are a number of variations to this invention that could be done, as will now be described. Like all of the antipiracy measures already discussed, the basic idea is to add more and more complexity such as to make the task of defeating the antipiracy measures less and less desirable to attempt, and to make successful attempts limited in their usefulness.

Variations on the Number of Strings

The current invention is not limited to using one duicstring and one kuicstring and one acstring. An end user can be asked by the software to provide as many strings as desired. In a multistring entry embodiment, the requesting entry window that a developer could cause an end user to see would simply ask for more than one string, using one or more entry windows, with one or more sets of internal unique tables and strings.

Variations on the Use of PAC and TAC Tables

In the current embodiment of the invention, no interposing array of numbers was used to extract letters from the PAC and TAC tables, but a sum modulus was used. As with all arrays, one or more such arrays of numbers could have been used, as well as some type of mathematical formula.

Variations on Identifying a Permanent Versus Temporary AC

For the current embodiment, as well as for ease of explanation, I chose to have four capital letters within an acstring identify the acstring as a PAC or a TAC, with a trail of obfuscating steps in the process of deriving values. However, more obfuscating steps could be added such as having one or more of the characters be numbers that were even or odd, or added up to even or odd, or some other way of coming up with a way of numerically distinguishing between one of two outcomes that could confirm permanent versus temporary.

Variations on Table Depths and Indexing

A table of any depth could be used, say, depth 100, with a matching base 100 number system for indexing it instead of the base sixteen number system used. Instead of using a different number system, the normal base 10 number system could be kept, and a formula used to derive the proper integers 0 to 99 could be used. For example by multiplying the non-zero digits of MMDDmm instead of adding them, and then taking the modulus base 100.

Variations on Scrambling

Instead of having an interposing array of numbers to put together strings, or to extract them from a string, such as FIG. 15 104 and FIG. 17 106, we could instead mix up the target characters. For example in FIG. 17 106, just have the far left targets, $CM1, $CM2, etcetera, be out of order. One could also keep the interposing array of numbers, and have also a scrambling of the targets. There could also be one or more interposing arrays of numbers to define the said targets, with or without combinations of the other said interposing arrays.

Instead of interposing arrays of numbers for scrambling, at any stage of string or array construction or deconstruction, mathematical formulas for deriving string or array position numbers could be used, or any combination of interposing arrays and formulas.

The only thing to keep in mind is that, no matter how character strings are put together, the reverse has to be done to get back the original individual elements.

Variations on Tables for Putting Together Uicstrings

The choice of having different tables for the kuicstring and the acstring was arbitrary. They could have been the same. Also, instead of having a single array of twenty numbers such as @uicstring_position_numbers 78, an array of, say, depth sixteen, could have been used, wherein each of the sixteen elements could in itself be an array of numbers, scrambled or unscrambled, such as with @uicstring_position_numbers. Schemes for choosing which of the sixteen arrays of twenty numbers to use could be thought of, such as the one for accessing the sixteen elements of the @PAC_table 95. Any of the schemes previously mentioned for working with strings and tables could be used.

Variations on Information Carried within Uicstrings or Acstrings

Using the methods of this invention, any sort of information could be disguised and placed within one or more uicstrings and/or acstrings, especially if the character lengths were increased. For example a special code to shut down or uninstall, or whether or not to pop up advertisements, and how often.

Variation on Invoking Subroutines of the Antipiracy Code

The software application code's invocation calls to the antipiracy code based on this invention can have a needed non-antipiracy action take place. That is, one need would be the antipiracy check, and another need would be for the application code itself to properly operate. For example, have the invocation to check for antipiracy also use one or more parameters that could be numbers to be added, that the application code will later check. The invocating code could also count the parameters given, and the antipiracy code could also check the number of parameters, and then do the addition on the numbers, and return the needed sum along with the results of the antipiracy check. Therefore, removal of the antipiracy code will destroy the software application being protected.

Attention is directed now to how a software pirate is prevented from using an expired password to install a protected software application by simply turning back the computer clock.

Quite simply, during installation, this invention obtains the current time from what is known as a Network Time Protocol server, commonly called an ntp server. The protected application program is required to have access to the internet at the time of installation for this to be accomplished. The time returned by an ntp server is in epoch seconds, which are the seconds since Jan. 1, 1970. In a software application protected by this invention, if the ntp time substantially differs from the computer time, the software application will refuse to install. The time difference allowed in the current embodiment is three hours high or low, which is a six hour total window of time. As with any antipiracy check, the invocations to the code of this invention to check that the clock and ntp times being okay can be done in as many places as desired during the installation process.

The method of connecting to the internet to get the time is well known and will not be discussed further except to state that the current embodiment is based upon the Network Time Protocol Specification known as RFC 1305, Version 3.

Attention is directed now to preventing a software pirate from using his own program to continually feed a protected program generated actuation codes in an attempt to enable use of protected software. The vendor who utilizes this invention would simply ask an end user for an actuation code, say, in a pop up window, and then exit out of the protected program altogether if there were too many failed attempts, such as three failed attempts.

What is claimed is:

1. A method of protecting a copy of a software application against piracy, said method implemented as software running on a computer, said method comprising the steps of:
   a. selecting a seed string of random length containing a series of random characters;
   b. generating, as a function of said seed string, a knowledge string by transforming said seed string, through one or more steps of character substitutions using strings of random characters, into said knowledge string, wherein for each character in said seed string:
      b.1. using said character in said seed string as an index to a first random string;
      b.2. using said indexed character in said first random string as an index to a second random string;
      b.3. placing said indexed character in said second random string into an intermediate string; and
      b.4. scrambling said intermediate string into said knowledge string using a third random string;
   c. generating, as a function of said seed string and said knowledge string, an activation code;
   d. encoding, with said copy of a software application, said knowledge string and software code to internally generate said seed string from said knowledge string, said software code also internally generating said activation code using said internally-generated seed string and said encoded knowledge string, said software code checking said internally-generated activation code against an externally-supplied activation code and verifying a non-pirated copy of said software application if a match is found between said internally-generated activation code and said externally-supplied activation code.

2. The method of claim 1 wherein said scrambling step further comprises the step, for each character in said intermediate string, of using the character in said third random string in the corresponding position as each character in said intermediate string as an index into said knowledge string indicating the position in said knowledge string of the character from said intermediate string.

3. The method of claim 2 wherein said encoding step further comprises the step of encoding, with said copy of a software application, said first, second and third random strings.

4. The method of claim 2 further comprising the steps of padding said intermediate string with characters from a fourth random string until said intermediate string reaches a desired length.

5. The method of claim 4 further comprising the step of encoding, with said copy of a software application, said first, second, third and fourth random strings.

6. The method of claim 4 wherein said fourth random string contains additional information to be scrambled into said knowledge string instead of random characters.

7. The method of claim 3 wherein said step of generating said activation code further comprises the steps of:
   a. providing a first array of N length containing N character strings;
   b. summing the characters in said seed string and using the modulus N function on said sum as an index into said first array;
   c. using each character in said indexed string in said first array as an index into said third random string;
   d. using each indexed character in said third random string as an index into said knowledge string; and
   e. placing each indexed character in said knowledge string into said activation code.

8. The method of claim 7 wherein said encoding step further comprises the step of encoding, with said copy of a software application, said first array.

9. The method of claim 8 further comprising the steps of:
   a. providing a second array of N length containing N character strings;
   b. summing the characters in said seed string and using the modulus N function on said sum as an index into said second array; and
   c. placing the indexed string from said second array into said activation code.

10. The method of claim 9 wherein said encoding step further comprises the step of encoding, with said copy of a software application, said second array.

11. The method of claim 10 wherein the said second array is chosen as one of two available arrays, with the first available array indicating that said activation code is temporary and said a second available array indicating that said activation code is permanent.

12. The method of claim 11 further comprising the steps of:
   a. generating a date-time string; and
   b. transforming said date-time string, through one or more steps of character substitutions using strings of random characters, into characters to be placed into said activation code.

13. The method of claim 12 further comprising the steps of:
   a. using each character of said date-time stamp as an index into a fifth random string;
   b. using each indexed character in said fifth random string as an index into a sixth random string; and
   c. placing each character in said sixth random string into said activation code.

14. The method of claim 12 wherein said encoding step further comprises the step of encoding, with said copy of a software application, said fifth and sixth random strings.

15. The method of claim 9 wherein said activation code is a concatenation of said indexed string from said second array and said indexed characters from said knowledge string.

16. The method of claim 13 wherein said activation code is a concatenation of said indexed characters from said knowledge string, said indexed string from said second array and said transformed date-time string.

17. The method of claim 16 wherein said encoding step further comprises the step of encoding, with said copy of a software application, said fifth and sixth random strings.

18. The method of claim 13 further comprising the step of scrambling said activation code using a seventh random string.

19. The method of claim 18 wherein said encoding step further comprises the step of encoding, with said copy of a software application, said fifth, sixth and seventh random strings.

20. The method of claim 1 further comprising the step of providing, to a licensed user of said copy of said software application, said activation code.

21. The method of claim 1 further comprising the step of storing said activation code in a configuration file in encoded form.

22. The method of claim 21 further comprising the step of storing information capable of uniquely identifying said computer in said configuration file in encoded form.

23. The method of claim 21 wherein said software code, during post-installation running of said software application, extracts said date-time stamp from said activation string encoded in said configuration file and prevents the running of said software application if the difference between the current date-time and said extracted data-time stamp is greater than a predetermined period of time.

24. The method of claim 21 wherein said software code, during post-installation running of said software application, extracts computer identification information from said configuration file and prevents the running of said software application if the computer identification information indicates that said software application is running on a computer different from said computer on which said software application was initially installed.

25. The method of claim 1 wherein said software application periodically calls said embedded code to detect a pirated copy of said software application and prevents running of said copy of said software application if a pirated copy is detected.

26. The method of claim 1 wherein said seed string contains a date-time stamp.

* * * * *